US012348628B2

(12) United States Patent
Lin et al.

(10) Patent No.: US 12,348,628 B2
(45) Date of Patent: Jul. 1, 2025

(54) DATA PROCESSING METHOD, APPARATUS, COMPUTER PROGRAM, AND STORAGE MEDIUM

(71) Applicant: Tencent Technology (Shenzhen) Company Limited, Guangdong (CN)

(72) Inventors: Weikun Lin, Shenzhen (CN); Zhiqiang Dong, Shenzhen (CN); Bin Li, Shenzhen (CN); Shengli Ji, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 288 days.

(21) Appl. No.: 17/851,878

(22) Filed: Jun. 28, 2022

(65) Prior Publication Data

US 2022/0329422 A1 Oct. 13, 2022

Related U.S. Application Data

(63) Continuation of application No. PCT/CN2021/094022, filed on May 17, 2021.

(30) Foreign Application Priority Data

Jun. 30, 2020 (CN) .......................... 202010615081.1

(51) Int. Cl.
*H04L 9/08* (2006.01)
*H04L 9/14* (2006.01)

(52) U.S. Cl.
CPC .......... *H04L 9/0877* (2013.01); *H04L 9/0825* (2013.01); *H04L 9/085* (2013.01); *H04L 9/14* (2013.01)

(58) Field of Classification Search
CPC ..... H04L 9/0877; H04L 9/0825; H04L 9/085; H04L 9/14; H04L 9/0819; H04L 9/0897;
(Continued)

(56) References Cited

U.S. PATENT DOCUMENTS 9,887,836 B1 * 2/2018 Roth .................. H04L 9/088
2010/0174878 A1 * 7/2010 Davis ................. G06F 3/0686
711/E12.001

(Continued)

FOREIGN PATENT DOCUMENTS

CN 101442404 A 5/2009
CN 101593389 A 12/2009
(Continued)

OTHER PUBLICATIONS

International Search Report and Written Opinion for priority application No. PCT/CN2021/094022 dated Aug. 16, 2021, 10p, in Chinese language.
(Continued)

*Primary Examiner* — Farid Homayounmehr
*Assistant Examiner* — Suman Debnath
(74) *Attorney, Agent, or Firm* — Crowell & Moring LLP

(57) ABSTRACT

Improved accuracy of data encryption can be achieved with dynamic expansion according to the traffic volume of a user. A processing server transmits a key identifier to a hardware security module server which obtains a root key corresponding to the key identifier and encrypts the root key to generate a master key. The master key is encrypted to generate a data key, and the to-be-encrypted data is encrypted using the data key to generate encrypted data. The processing server can accurately and effectively encrypt data, improving the accuracy of data encryption and the security of data processing.

20 Claims, 24 Drawing Sheets

(58) Field of Classification Search
CPC ....... H04L 9/50; H04L 63/062; H04L 9/0822; H04L 9/083; H04L 63/0428; H04L 67/02
See application file for complete search history.

(56) References Cited

U.S. PATENT DOCUMENTS

| | | | |
|---|---|---|---|
| 2011/0182175 A1* | 7/2011 | Zhang ................... | H04L 1/0025 370/252 |
| 2014/0247938 A1* | 9/2014 | Desmicht ............. | H04L 9/0861 380/44 |
| 2018/0131688 A1* | 5/2018 | Fang ................... | H04L 63/0823 |
| 2020/0320489 A1* | 10/2020 | Vagare ................. | H04L 9/0838 |

FOREIGN PATENT DOCUMENTS

| | | |
|---|---|---|
| CN | 105634730 A | 6/2016 |
| CN | 107124271 A | 9/2017 |
| CN | 107786328 A | 3/2018 |
| CN | 108123800 A | 6/2018 |
| CN | 110061983 A | 7/2019 |
| CN | 111818032 A | 10/2020 |
| WO | WO 2020/206953 A1 | 10/2020 |

OTHER PUBLICATIONS

English language translation of the International Search Report for priority application No. PCT/CN2021/094022 dated Aug. 16, 2021, 2p.

First Office Action and Search Report for Chinese application No. 202010615081.1 dated Apr. 28, 2021, 7p, in Chinese language. Concise Explanation of Relevancy.

* cited by examiner

DATA PROCESSING METHOD, APPARATUS, COMPUTER PROGRAM, AND STORAGE MEDIUM

RELATED APPLICATION

This application is a continuation of PCT/CN2021/094022, filed on May 17, 2021 and entitled "DATA PROCESSING METHOD AND APPARATUS, AND COMPUTER PROGRAM AND STORAGE MEDIUM," which claims priority to Chinese Patent Application No. 202010615081.1 filed on Jun. 30, 2020, each of which are incorporated by reference in their entirety.

FIELD OF THE TECHNOLOGY

This application relates to the field of Internet technologies, and in particular, to a data processing method, apparatus, computer program, and storage medium.

BACKGROUND OF THE DISCLOSURE

Data encryption processing is one of the most reliable methods for computer systems to protect information. Data encryption processing is to use a cryptographic technology to encrypt information to achieve information concealment, so as to protect information security.

The method of encrypting data is often implemented by a hardware security module, and a client communicates with the hardware security module through a software development kit (SDK) provided by the hardware security module manufacturer. A key is generated and stored inside the hardware security module. When the client starts encryption, the client passes sensitive information into the hardware security module through the Hypertext Transfer Protocol Secure (HTTPS) for encryption and decryption.

However, the method using a hardware security module requires high configuration costs, the method of directly encrypting and decrypting data through the hardware security module cannot accurately and effectively encrypt the data to be encrypted, and the accuracy of data encryption and the security in the data processing process cannot be ensured.

SUMMARY

In view of this, embodiments of this application provide a data processing method, apparatus, computer program and storage medium, where through interaction between a processing server, a hardware security module server, and a hardware security module in a data processing system, the processing server can accurately and effectively encrypt data to be encrypted, thereby improving the accuracy of data encryption and the security of the data processing process.

The technical solutions in the embodiments of this application are implemented as follows.

The embodiments of this application provide a data processing method, executed by a processing server in a data processing system, the data processing system including the processing server, a hardware security module server, a hardware security module, and a client, the method including:
 receiving a data encryption request transmitted by the client, the data encryption request including to-be-encrypted data and a first key identifier;
 transmitting the first key identifier to the hardware security module server, so that the hardware security module server obtains a root key corresponding to the first key identifier from the hardware security module, and encrypts the root key to generate a master key;
 receiving the master key transmitted by the hardware security module server;
 encrypting the master key to generate a data key; and
 encrypting the to-be-encrypted data by using the data key to obtain encrypted data.

The embodiments of this application provide a data processing method, executed by a hardware security module server in a data processing system, the data processing system including a processing server, the hardware security module server, and a hardware security module, the method including:
 receiving a key obtaining request transmitted by the processing server, the key obtaining request including a first key identifier;
 obtaining a root key corresponding to the first key identifier from the hardware security module;
 encrypting the root key to generate a master key;
 transmitting the master key to the processing server, so that the processing server generates a data key according to the master key, and encrypts to-be-encrypted data by using the data key.

The embodiments of this application provide a data processing apparatus, including:
 a first receiving module, configured to receive a data encryption request transmitted by the client, the data encryption request including to-be-encrypted data and a first key identifier;
 a first transmission module, configured to transmit the first key identifier to a hardware security module server in a data processing system, obtaining a root key corresponding to the first key identifier from a hardware security module in the data processing system through the hardware security module server, and encrypting the root key to generate a master key;
 a second receiving module, configured to receive the master key transmitted by the hardware security module server;
 a first key encryption module, configured to encrypt the master key to generate a data key; and
 a data encryption module, configured to encrypt the to-be-encrypted data by using the data key to obtain encrypted data.

The embodiments of this application provide a computer program product or a computer program, including computer instructions, the computer instructions being stored in a non-transitory computer-readable storage medium,
 a processor of a computer device reading the computer instructions from the non-transitory computer-readable storage medium,
 the processor being configured to execute the computer instructions to implement the data processing method described above.

The embodiments of this application provide a data processing device, including:
 a memory, configured to store executable instructions; and a processor, configured to execute the executable instructions stored in the memory to implement the data processing method described above.

The embodiments of this application provide a non-transitory computer-readable storage medium, storing executable instructions, the executable instructions, when executed by a processor, implementing the data processing method described above.

The embodiments of this application may have the following beneficial effects: The processing server in the data processing system transmits a first key identifier to the hardware security module server, the hardware security module server obtains a root key corresponding to the first key identifier from the hardware security module and encrypts the root key to generate a master key, and the processing server encrypts the master key to generate a data key and encrypts the to-be-encrypted data by using the data key. In this way, through the interaction between the processing server, the hardware security module server, and the hardware security module in the data processing system, a highly reliable data key is generated, so that the processing server in the data processing system can accurately and effectively encrypt data to be encrypted by using the generated data key, thereby improving the accuracy of data encryption and the security of the data processing process.

DESCRIPTION OF EMBODIMENTS

Figure 1:
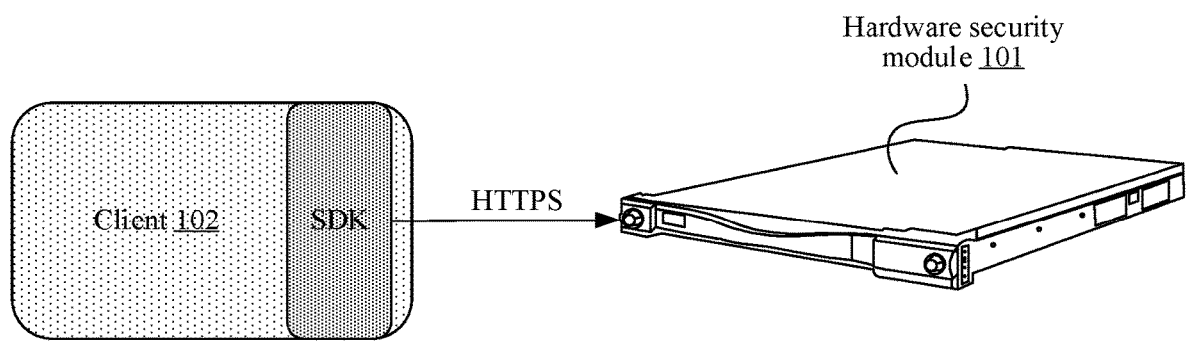
FIG. 1 is a schematic structural diagram of a data encryption system that adopts a hardware security module to perform data encryption.

The objectives, technical solutions, and advantages of this application are described in further detail below with reference to the accompanying drawings. The described embodiments are not to be considered as a limitation to this application. All other embodiments obtained by a person of ordinary skill in the art without creative efforts shall fall within the protection scope of this application.

In the following descriptions, the term "some embodiments" describes subsets of all possible embodiments, but it may be understood that "some embodiments" may be the same subset or different subsets of all the possible embodiments, and can be combined with each other without conflict. Unless otherwise defined, meanings of all technical and scientific terms used in this application are the same as those usually understood by a person skilled in the art to which the embodiments of this application belong. Terms used in the embodiments of this application are merely intended to describe objectives of the embodiments of this application, but are not intended to limit this application.

Terms involved in this application are explained first before explaining the embodiments of this application:

1) Cloud computing is a computing mode, in which computing tasks are distributed on a resource pool formed by a large quantity of computers, so that various application systems can obtain computing power, storage space, and information services according to requirements. Cloud computing includes computing, storage, and other capabilities.

2) Cloud platform: It is a cloud product for providing cloud computing, big data, artificial intelligence services, and customized industry solutions, or is a cloud product for providing cloud computing services such as cloud servers, cloud hosts, and databases. The data processing method in the embodiments of this application may be a cloud platform-based data processing method, and may at least be applied to a Tencent cloud platform or a Tencent cloud product, so as to implement the cloud platform-based data processing method of the embodiments of this application through a Tencent cloud.

3) Key Management System (KMS): It is a security management service that allows users to create and manage keys in this system. This system can protect the confidentiality, integrity, and availability of keys, meeting the key management needs of users for multiple applications and multiple services and meeting regulatory and compliance requirements.

4) Hardware Security Module (HSM): It is a device or hardware module specially used for key storage, encryption, and decryption.

5) PKCS #11: It is a public-key cryptography standard developed by RSA laboratories. PKCS #11 defines a set of platform-independent APIs for cryptographic tokens, such as hardware security modules and smart cards.

To provide a better understanding of the data processing methods provided in the embodiments of this application, general data processing methods are described first.

In recent years, cloud computing has become the strategic focus of the development of the information technology industry, and information technology companies around the world are transforming to cloud computing. Conventional encryption methods face many problems. One problem is regarding key storage, especially, the security of keys, because encryption algorithms used in the industry are generally public. Another problem is regarding the security of random numbers: a local server generates a pseudo-random number as a basic cipher key, which may be guessed and attacked.

In order to solve the problems of conventional encryption methods, some manufacturers purchase hardware security modules (HSMs) for generation and storage of keys, which solves the above two problems. Some countries also have regulations on the use of HSMs. At present, many financial companies use this method.

FIG. 1 is a schematic structural diagram of a data encryption system that adopts a hardware security module to perform data encryption. As shown in FIG. 1, the data encryption system includes a hardware security module 101 and a user's client 102, where the client 102 is a client that uses a key. The client 102 communicates with the hardware security module 101 through an SDK provided by the manufacturer of the hardware security module 101. The key is generated and stored inside the hardware security module 101. When the client 102 starts encryption, the client 102 transmits sensitive information to the hardware security module 101 through the HTTPS protocol for encryption and decryption, so as to ensure the security of the information.

Although the described may help solve the security problem of the encryption scenario, it is only suitable for some large manufacturers, and has the following problems: First, the configuration costs are high, and the resources cannot be used reasonably. Only some large enterprises can afford the high costs of the hardware security module. Second, the costs of use are high and the development cycle is long. It is desirable to develop programs based on the SDK of the manufacturer. In each client environment, it is also desirable to configure the operating environment for the SDK of the manufacturer. Third, the architecture is inflexible and cannot cope with changing needs. For example, compliance requirements differ greatly in China and other countries. Standards in China are based on China's national cryptographic system, while international standards follow the Federal Information Processing Standards developed by the National Institute of Standards and Technology (NIST) of the United States. When a Chinese customer wants to develop international business, a system compatible with the two sets of standards needs to be developed in order to meet the requirements.

The embodiments of this application provide a data processing method, which may help solve the above problems by using a cloud-based multi-tenant key management solution for the hardware security module, and can be dynamically expanded according to the traffic volume of the user. This method is applicable to a data processing system. The data processing system at least includes a processing server, a hardware security module server, and a hardware security module. The processing server in the data processing system transmits a first key identifier to the hardware security module server, the hardware security module server obtains a root key corresponding to the first key identifier from the hardware security module and encrypts the root key to generate a master key, and the processing server encrypts the master key to generate a data key and encrypts the to-be-encrypted data by using the data key. In this way, through the interaction between the processing server, the hardware security module server, and the hardware security module in the data processing system, a highly reliable data key is generated, so that the processing server in the data processing system can accurately and effectively encrypt data to be encrypted transmitted by the client by using the generated data key, thereby improving the accuracy of data encryption and the security of the data processing process.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

Example applications of the data processing device provided by the embodiments of this application are described below. The data processing device provided by the embodiments of this application may be implemented as a notebook computer, a tablet computer, a desktop computer, a mobile device (for example, a mobile phone, a portable music player, a personal digital assistant, a special messaging device, or a portable game device), an intelligent robot, an e-book reader, an in-vehicle computer, a wearable electronic device, a smart home, a VR/AR device, or any other terminal with computing and data processing capabilities, or may be implemented as a server. An example application where the data processing device is implemented as a server will be described below.

Figure 2A:
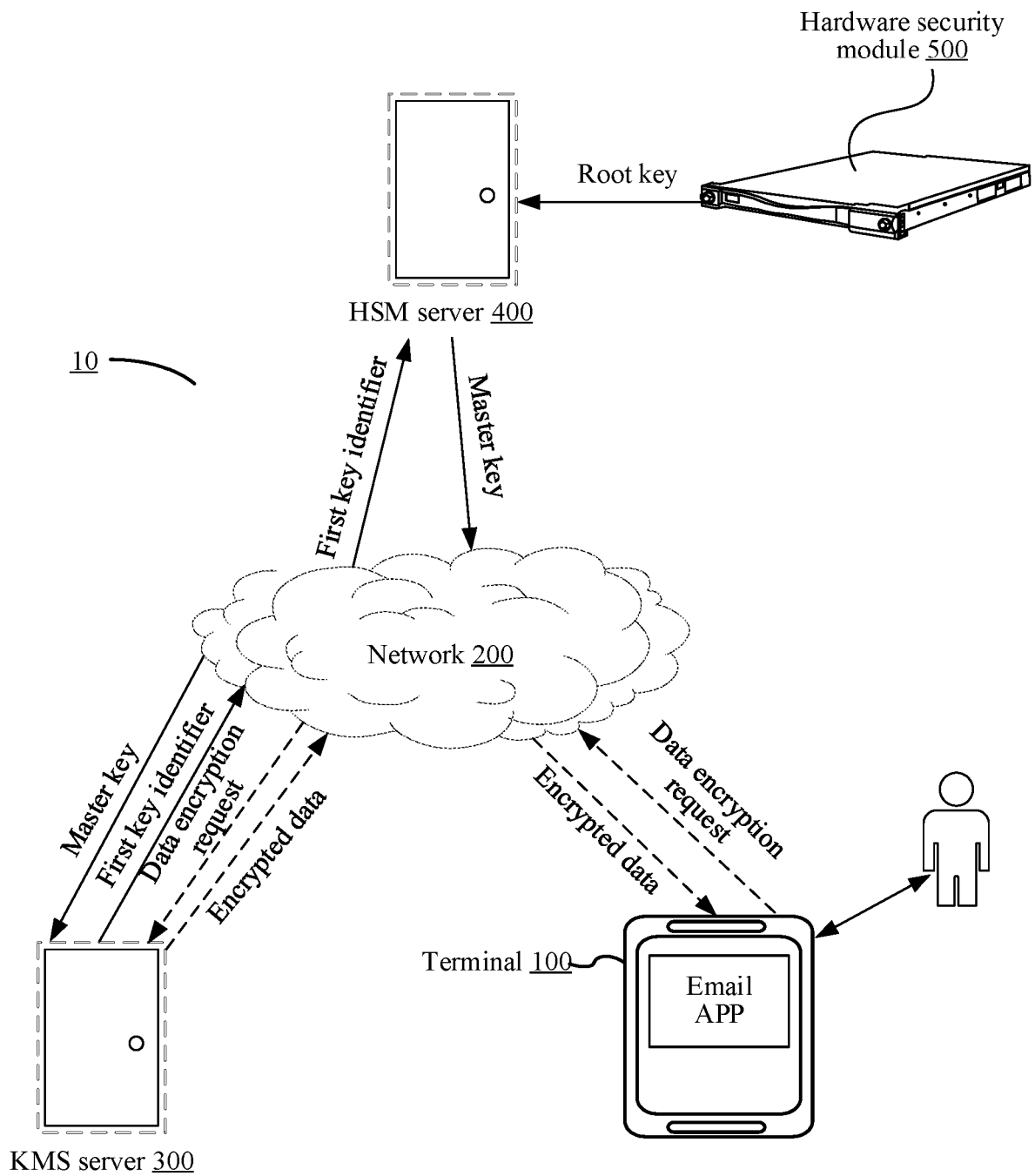
FIG. 2A is an example schematic architectural diagram of a data processing system according to an embodiment of this application.

FIG. 2A is an example schematic architectural diagram of a data processing system 10 according to an embodiment of this application. In some embodiments, the above-mentioned processing server may be a KMS server, and the hardware security module server may be an HSM server. In order to support any data processing application (e.g., email APP), the data processing system 10 includes a terminal 100, a network 200, a KMS server 300, an HSM server 400, and a hardware security module 500. An email APP runs on the terminal 100, and the user can read an email or edit and send an email on a client of the email APP. When the user intends to send an email on the terminal 100, the content of the email may be encrypted. In this embodiment, the method provided in the embodiments of this application can be used. In some embodiments, the terminal transmits a data encryption request to the KMS server 300 through the network 200, the data encryption request including to-be-encrypted data (which may be an email or an attachment in the email) and a first key identifier. The KMS server 300 transmits the first key identifier to the HSM server 400. The HSM server 400 obtains a root key corresponding to the first key identifier from the HSM 500, and encrypts the root key to generate a master key. The HSM server 400 transmits the master key to the KMS server 300. The KMS server 300 encrypts the master key to generate a data key, encrypts the to-be-encrypted data by using the data key to obtain encrypted data, and transmits the encrypted data to the terminal 100. The edited email may be displayed on a current interface of the terminal 100, and after the encryption is complete, a word "encrypted" may further be displayed on the current interface to remind the user that the email encryption process has been completed.

Figure 2B:
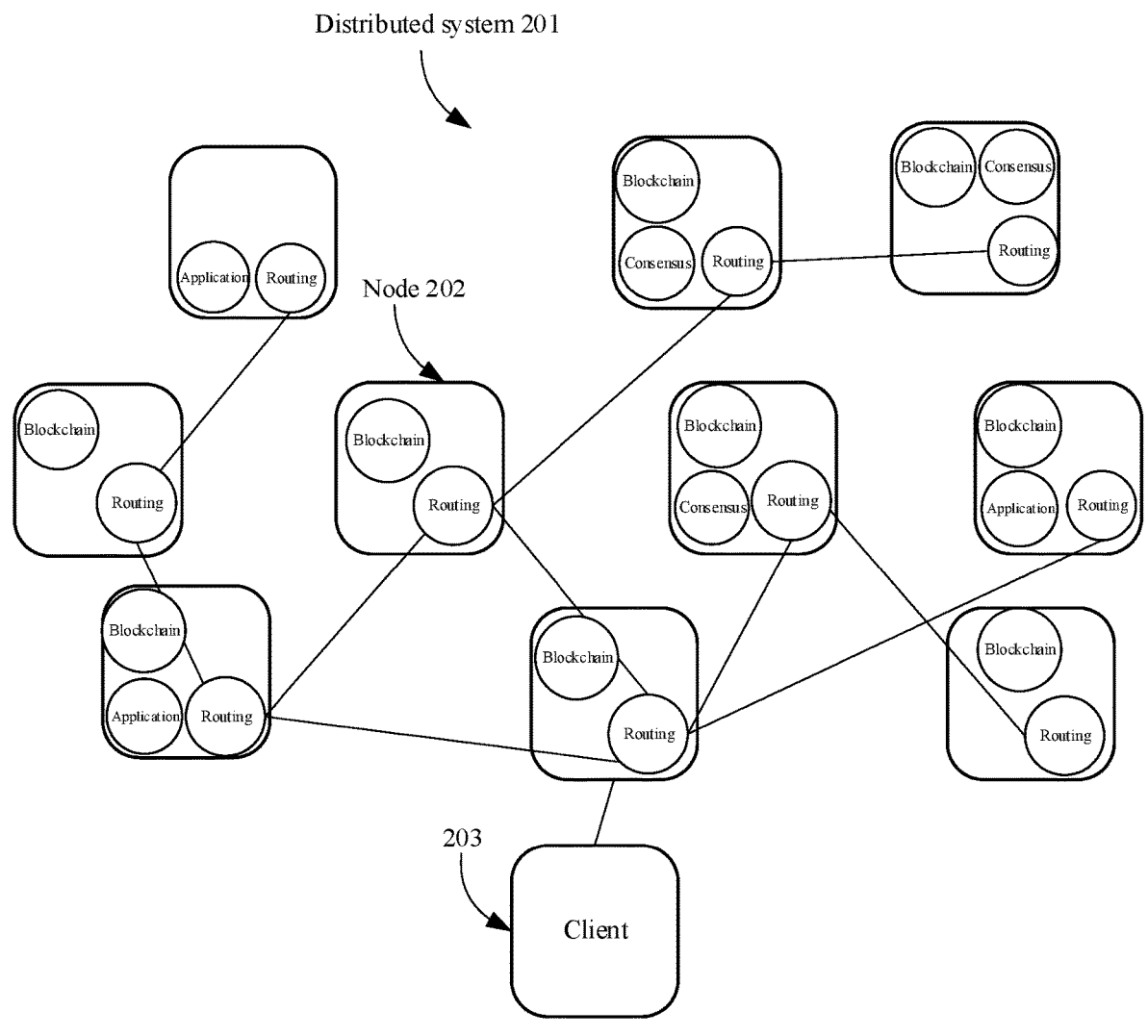
FIG. 2B is an example schematic structural diagram of a data processing system applied to a blockchain system according to an embodiment of this application.

The data processing system 10 involved in the embodiments of this application may also be a distributed system 201 of a blockchain system. FIG. 2B is an example schematic structural diagram of a data processing system 10 applied to a blockchain system according to an embodiment of this application. Referring to FIG. 2B, the distributed system 201 may be a distributed system formed by a plurality of nodes 202 (which may be any form of computing devices connecting to the network, such as a server or a user terminal) and a client 203. A peer-to-peer (P2P) network is formed between the nodes. The P2P protocol is an application layer protocol that runs over the Transmission Control Protocol (TCP) protocol. Any machine such as a server or a terminal may be added to a distributed system to become a node. The node includes a hardware layer, an intermediate layer, an operating system layer, and an application layer.

In the distributed system 201, each node 202 corresponds to any one of a terminal 100, a KMS server, or an HSM server, and at each node 202, data of the node 202 is collected. For example, for the terminal 100, to-be-encrypted data and encrypted data of the client running on the terminal 100 may be collected; for the KMS server, a data key generated on the KMS server may be collected; for the HSM server, a root key and/or a master key obtained on the HSM server may be collected. That is to say, the data and keys in the entire data encryption process are collected. Alternatively, in some embodiments, the data key includes key ciphertext and key plaintext, and only the key ciphertext is collected during the key collection process.

In the embodiments of this application, by collecting the data and keys and uploading the data and keys to a blockchain, it can be ensured that in the subsequent data processing process, the stored keys can be directly obtained from the blockchain system, keys for encryption and decryption can be provided for the subsequent data encryption and data decryption processes according to the stored key, and a new key for subsequent data processing can be obtained by encrypting or decrypting the stored keys.

In the embodiments of this application, in the blockchain system, each data/key is recorded and cannot be changed. As the user performs further operations on the terminal 100, the KMS server generates new data keys. Therefore, updating of the data and keys is involved, and accordingly, the data stored in the blockchain is also updated. Therefore, through the blockchain system in the embodiments of this application, the keys can be updated in a timely manner, so that a new key can be provided during subsequent data encryption and data decryption, thereby avoiding the security problem caused by the loss of the keys.

Referring to the functions of each node in the blockchain system shown in FIG. 2B, the functions involved in each node in the blockchain system are described in detail below:

(1) Routing: which is a basic function of a node, and is used for supporting communication between nodes. In addition to the routing function, the node device may further have the following functions: (2) Application: which is deployed in a blockchain, and is used for implementing a particular service according to an actual service requirement, recording data related to function implementation to form recorded data, adding a digital signature to the recorded data to indicate a source of task data, and transmitting the recorded data to another node in the blockchain system, so that the another node adds the recorded data to a temporary block when successfully verifying a source and integrity of the recorded data. For example, services implemented by the application include: (2.1) Wallet: used for providing a function of transacting with electronic money, including transaction initiation (that is, a transaction record of a current transaction is transmitted to another node in the blockchain system, and the another node stores, after successfully verifying the transaction record, data of the transaction record to a temporary block in the blockchain in response to admitting that the transaction is valid). The wallet further supports querying for remaining electronic money in an electronic money address. (2.2) Shared ledger: used for providing functions of operations such as storage, query, and modification of account data. Record data of an operation on the account data is transmitted to another node in the blockchain system. The another node stores, after verifying that the account data is valid, the record data to a temporary block in response to admitting that the account data is valid, and may further transmit an acknowledgement to the node initiating the operation. (2.3) Smart contract: which is a computerized protocol, may be used for executing conditions of a contract, and is implemented by using code that is deployed in the shared ledger and that is executed when a condition is satisfied. The code is used for completing, according to an actual service requirement, an automated transaction, for example, searching for a delivery status of goods purchased by a purchaser, and transferring electronic money of the purchaser to an address of a merchant after the purchaser signs for the goods. The smart contract is not limited to executing a contract for transactions, but may also execute a contract for processing received information. (3) Blockchain: including a series of blocks that are consecutive in a chronological order of generation. Once a new block is added to the blockchain, the new block is no longer removed. The block records recorded data submitted by the node in the blockchain system. (4) Consensus: It is a process in the blockchain network, and is used for a plurality of nodes involved to reach an agreement on a transaction in a block, so that the agreed block is added to an end of a blockchain. Consensus mechanisms include proof of work (PoW), proof of stake (PoS), delegated proof of stake (DPoS), and proof of elapsed time (PoET).

Figure 2C:
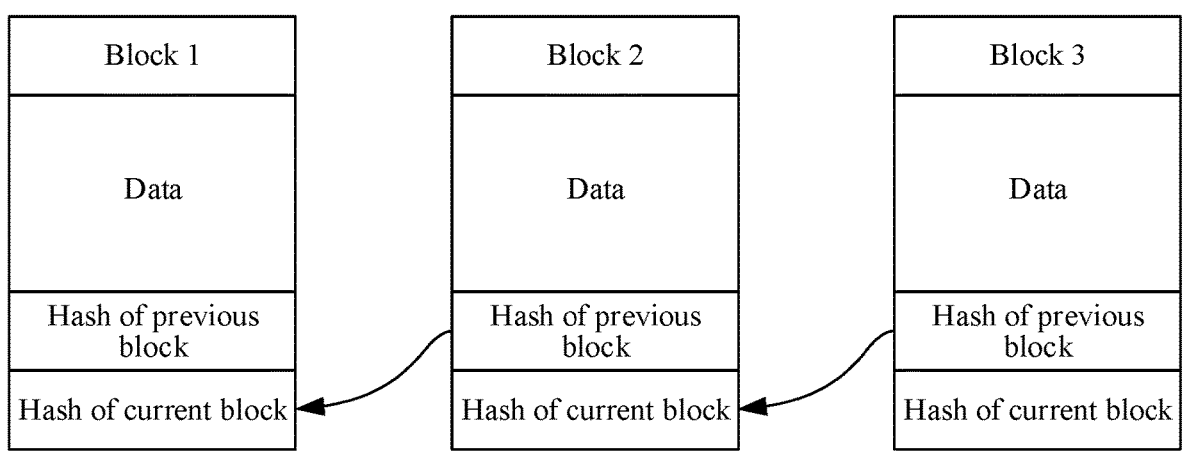
FIG. 2C is an example schematic diagram of a block structure according to an embodiment of this application.

FIG. 2C is an example schematic diagram of a block structure according to an embodiment of this application. Each block includes a hash value of a transaction record stored in the current block (hash value of the current block) and a hash value of a previous block. Blocks are connected according to hash values to form a blockchain. In addition, the block may further include information such as a timestamp indicating a block generation time. The blockchain is essentially a decentralized database and is a string of data blocks generated through association by using a cryptographic method. Each data block includes related information, the information being used for verifying the validity of information of the data block (anti-counterfeiting) and generating a next data block.

Figure 2D:
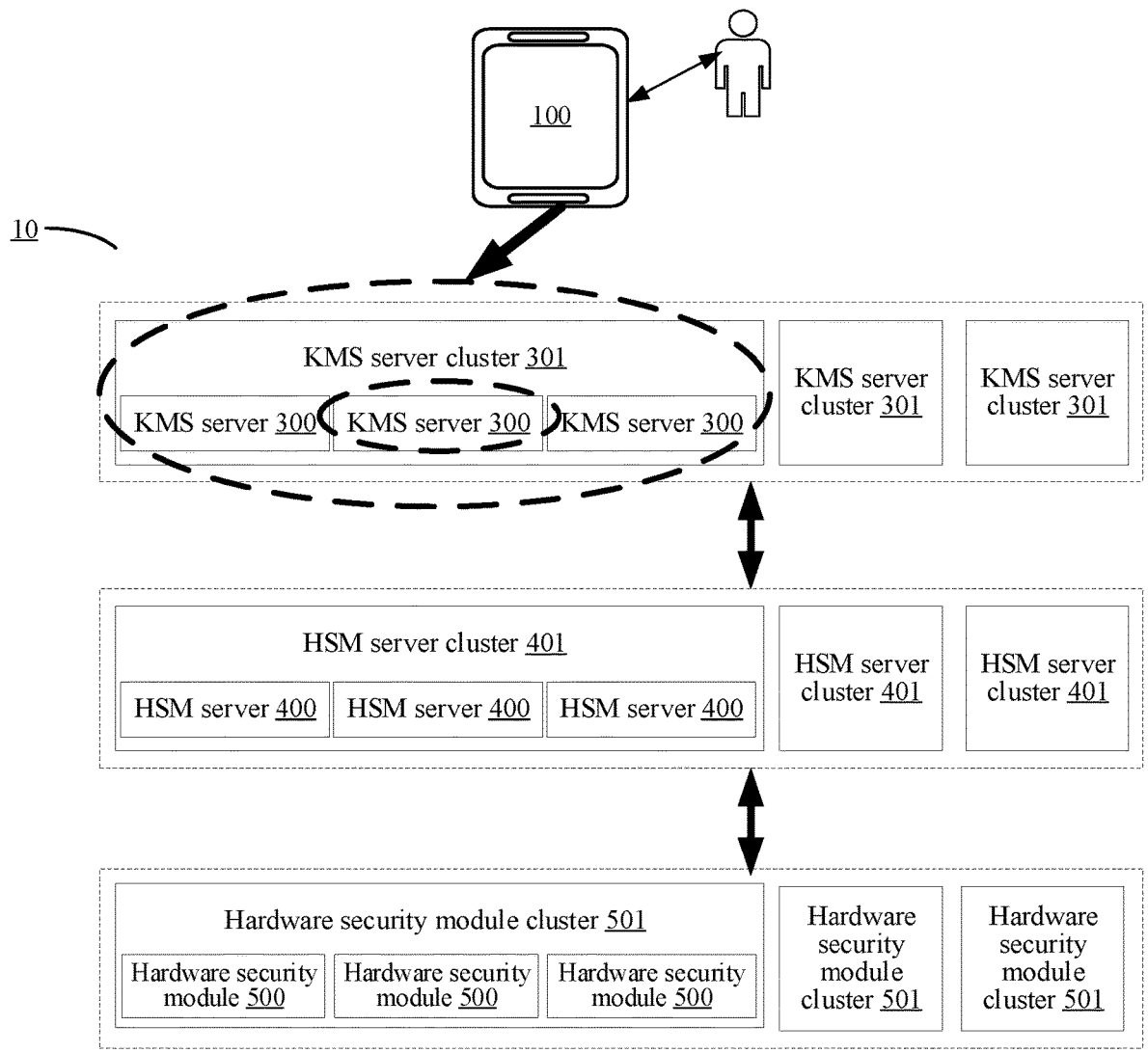
FIG. 2D is an example schematic architectural diagram of a data processing system according to an embodiment of this application.

In some embodiments, the data processing system 10 may also include multiple KMS servers, multiple HSM servers, and multiple hardware security modules, i.e., the data processing system 10 includes at least a terminal, a KMS server cluster, an HSM server cluster, and a hardware security module cluster. FIG. 2D is an example schematic architectural diagram of a data processing system 10 according to an embodiment of this application. As shown in FIG. 2D, the data processing system 10 includes a terminal 100, a KMS server cluster 301, an HSM server cluster 401, and a hardware security module cluster 501.

Still referring to FIG. 2D, the deployment of KMS servers, hardware security modules, and HSM servers in clusters may be carried out in a multi-location multi-center manner. That is, the number of KMS server clusters 301, the number of HSM server clusters 401, and the number of hardware security module clusters 501 may all be more than one, multiple different clusters may be deployed in different places, and there may be multiple equipment rooms in the same place.

The terminal 100 in the data processing system 10 is user-oriented. The user may install any application program that requires data encryption and data decryption on the terminal 100, and when data encryption or data decryption needs to be performed, the user transmits a data encryption request or a data decryption request to any KMS server in the KMS server cluster 301.

Each server in the KMS server cluster provides the same function, that is, any KMS server in the KMS server cluster 301 can implement the encryption or decryption of data of the terminal 100. Therefore, a KMS server may be determined in the KMS server cluster 301 as a target KMS server responding to the data encryption request of the terminal 100 by a specific method (for example, a KMS server in a dashed-line ellipse in FIG. 2D is the determined target KMS server).

In some other embodiments, there may be multiple KMS server clusters 301, that is, KMS server clusters 301 deployed in multiple places. In such embodiments, in response to the data encryption request of the terminal 100, first, a KMS server cluster 301 may be determined in the multiple KMS server clusters 301 as a target KMS server cluster responding to the data encryption request of the terminal 100 by a specific method (for example, a KMS server cluster in a dashed-line ellipse in FIG. 2D is the determined target KMS server cluster); then, a KMS server is determined in the target KMS server cluster as a target KMS server.

In some embodiments, the HSM server is a server that interacts with hardware security modules. Each HSM server corresponds to at least one hardware security module, and the HSM server is configured to obtain a root key from a hardware security module.

Figure 2E:
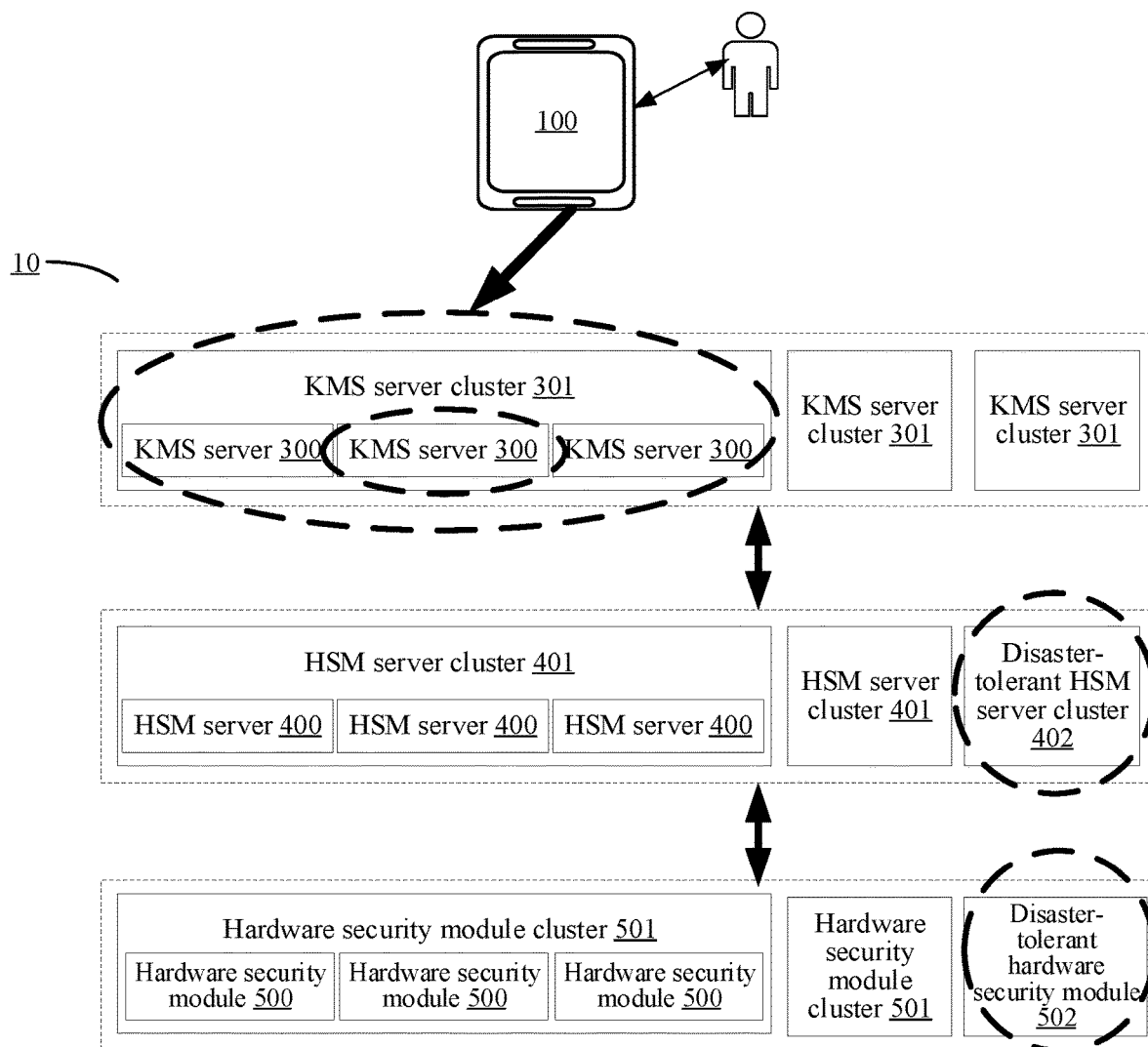
FIG. 2E is an example schematic architectural diagram of a data processing system according to an embodiment of this application.

FIG. 2E is an example schematic architectural diagram of a data processing system 10 according to an embodiment of this application. As shown in FIG. 2E, in some embodiments, the data processing system 10 further includes a disaster-tolerant HSM server cluster 402, and the disaster-tolerant HSM server cluster 402 is configured to determine the disaster-tolerant HSM server cluster is the target HSM server cluster when a total service demand of each of the HSM server clusters is greater than a threshold. In other words, the disaster-tolerant HSM server cluster 402 performs redundant disaster-tolerant processing for the data processing system 10, i.e., is a redundant server cluster that may help the data processing system 10 be disaster-tolerant. Correspondingly, the disaster-tolerant HSM server cluster 402 corresponds to at least one disaster-tolerant hardware security module 502, and the disaster-tolerant HSM server cluster 402 obtains a root key from the disaster-tolerant hardware security module 502 when performing redundant disaster-tolerant processing.

Figure 2F:
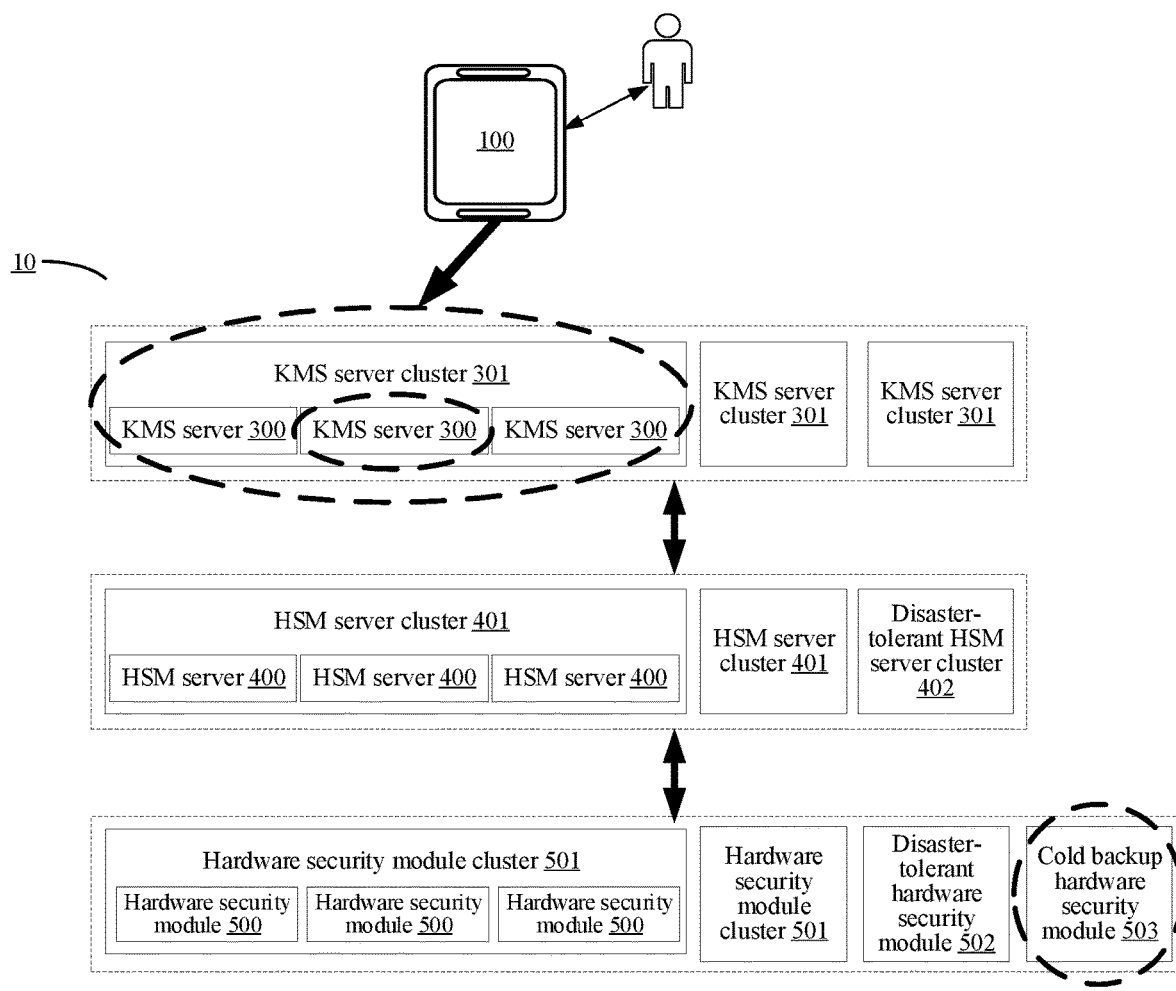
FIG. 2F is an example schematic architectural diagram of a data processing system according to an embodiment of this application.

FIG. 2F is an example schematic architectural diagram of a data processing system 10 according to an embodiment of this application. As shown in FIG. 2F, in some embodiments, the data processing system 10 further includes a cold backup hardware security module 503, and the cold backup hardware security module 503 is configured to obtain a root key from the cold backup hardware security module 503 when data in all hardware security modules corresponding to each HSM server in the data processing system is lost.

Figure 3:
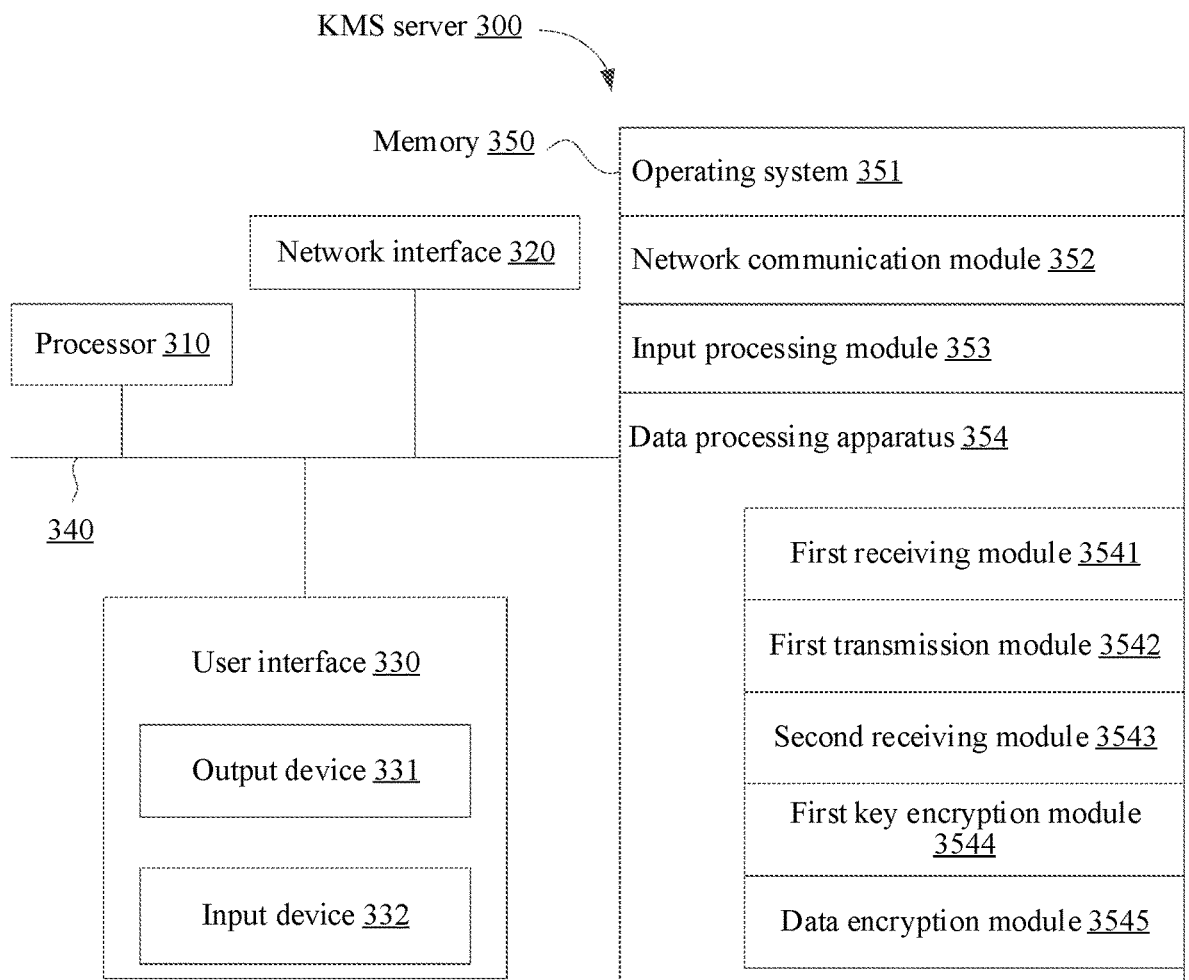
FIG. 3 is an example schematic structural diagram of a KMS server according to an embodiment of this application.

FIG. 3 is a schematic structural diagram of a KMS server 300 according to an embodiment of this application. The KMS server 300 shown in FIG. 3 includes: at least one processor 310, a memory 350, at least one network interface 320, and a user interface 330. Components in the KMS server 300 are coupled together by a bus system 340. It may be understood that the bus system 340 is configured to implement connection and communication between the components. In addition to a data bus, the bus system 340 further includes a power bus, a control bus, and a status signal bus. However, for ease of clear description, all types of buses are marked as the bus system 340 in FIG. 3.

The processor 310 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 330 includes one or more output devices 331 configured to display media content. The user interface 330 further includes one or more input devices 332, including a user interface component that facilitates user input.

The memory 350 may be a removable memory, a non-removable memory, or a combination thereof. Example hardware devices include a solid-state memory, a hard drive, an optical drive, and the like. The memory 350 may include one or more storage devices that are physically remote from the processor 310. The memory 350 includes a volatile memory or a non-volatile memory, or may include a volatile memory and a non-volatile memory. The non-volatile memory may be a read-only memory (ROM). The volatile memory may be a random access memory (RAM). The memory 350 described in the embodiments of this application is intended to include any suitable type of memories. In some embodiments, the memory 350 can store data to support various operations. Examples of the data include programs, modules, and data structures, or a subset or a superset thereof, which are illustrated by way of example below.

An operating system 351 includes a system program configured to process various basic system services and perform a hardware-related task, for example, a framework layer, a core library layer, and a driver layer, and is configured to implement various basic services and process a hardware-related task.

A network communication module 352 is configured to reach another computing device through one or more (wired or wireless) network interfaces 320. Example network interfaces 320 include: Bluetooth, wireless compatible authentication (WiFi), a universal serial bus (USB), and the like.

An input processing module 353 is configured to detect one or more user inputs or interactions from one of the one or more input apparatuses 332 and translate the detected input or interaction.

In some embodiments, the apparatus provided in the embodiments of this application may be implemented as software. FIG. 3 shows a data processing apparatus 354 stored in the memory 350. The data processing apparatus 354 may be a data processing apparatus in the KMS server 300, and may be software in the form of a program or plug-in, including the following software modules: a first receiving module 3541, a first transmission module 3542, a second receiving module 3543, a first key encryption module 3544, and a data encryption module 3545. These modules are logical modules, and therefore may be combined or divided arbitrarily according to the functions realized by the modules. The functions of the modules will be described below.

In some other embodiments, the cloud platform-based data processing method provided by the embodiments of this application may also be implemented by using the HSM server 400. The HSM server 400 (not shown in the figure) may also include: at least one processor, a terminal memory, at least one network interface, and a user interface. The data processing apparatus stored in the memory of the HSM server 400 may be a data processing apparatus in the HSM server 400. It may also be implemented as software. This may be software in the form of a program or plug-in, including the following software modules: a third receiving module, an obtaining module, a second key encryption module, and a second transmission module. These modules are also logical modules, and therefore may be combined or divided arbitrarily according to the functions realized by the modules.

In some other embodiments, the apparatus provided in the embodiments of the application may be implemented by using hardware. For example, the apparatus provided in the embodiments of the application may be a processor in a form of a hardware decoding processor, programmed to perform the data processing method provided in the embodiments of the application. For example, the processor in the form of a hardware decoding processor may be one or more Application Specific Integrated Circuits (ASICs), DSPs, Programmable Logic Devices (PLDs), Complex Programmable Logic Devices (CPLDs), Field Programmable Gate Arrays (FPGAs), or other electronic components.

In some embodiments, the data processing method provided by the embodiments of this application may also be implemented by using a cloud technology. The cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is used as required, and is flexible and convenient.

The cloud computing technology will become an important support. A background service of a technical network system requires a large amount of computing and storage resources, such as a video website, an image website, and more portal websites. As the Internet industry is highly developed and applied, each article may have its own identifier in the future and needs to be transmitted to a background system for logical processing. Data at different levels is separately processed, and data in various industries requires strong system support. This can be achieved by cloud computing.

Cloud computing is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid per use.

Figure 4:
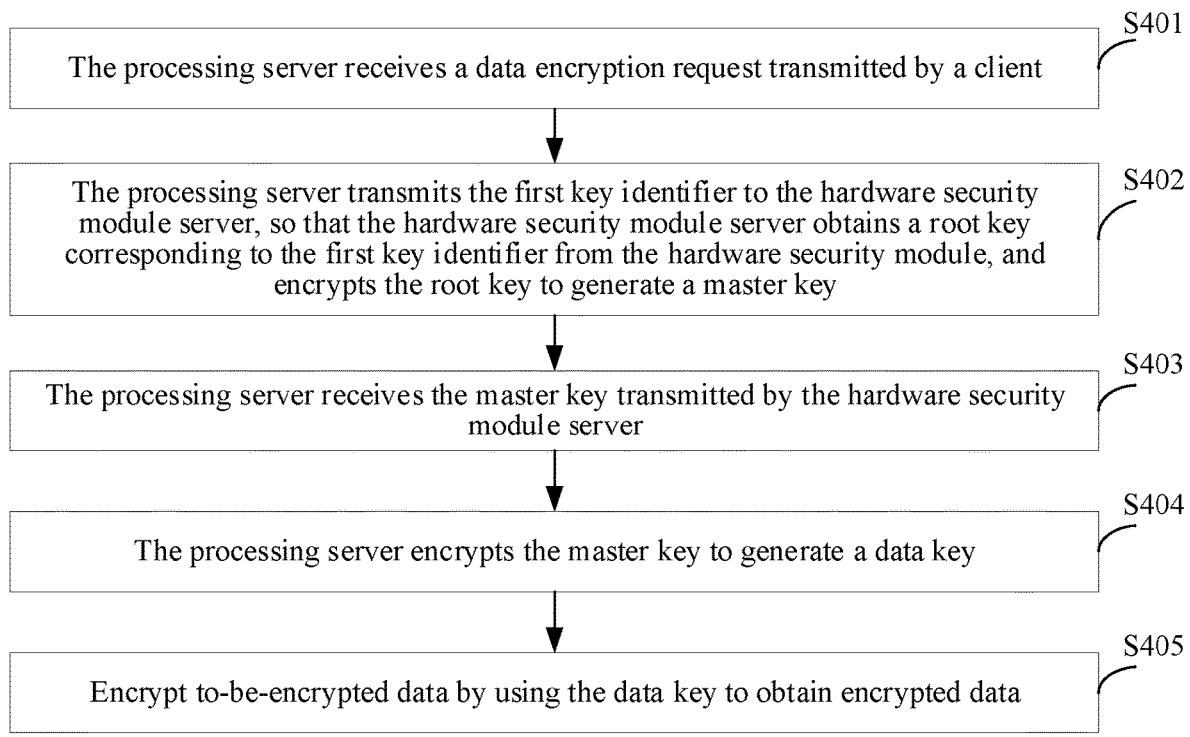
FIG. 4 is an example schematic flowchart of a data processing method according to an embodiment of this application.

The data processing method provided by the embodiments of this application will be described below with reference to example applications and implementations of the processing server provided by the embodiments of this application and the cloud technology. FIG. 4 is an example schematic flowchart of a data processing method according to an embodiment of this application. The data processing method may be a cloud platform-based data processing method. A cloud platform may be provided based on the cloud technology, so as to implement the data processing method of the embodiments of this application on the cloud platform. The data processing method provided by the embodiments of this application is executed by a processing server in a data processing system, where the data processing system includes the processing server, a hardware security module server, a hardware security module, and a client. The method will be described below with reference to the steps shown in FIG. 4.

Step S401: The processing server receives a data encryption request transmitted by a client.

The processing server may be a KMS server, the client is a client corresponding to the processing server, and a user may transmit the data encryption request to the processing server through the client. In the embodiments of this application, the user can create and manage keys by using the client to interact with the processing server, and the confidentiality, integrity, and availability of the keys are protected by the processing server, which meets the key management needs of users for multiple applications and multiple services.

In some embodiments, the data encryption request includes to-be-encrypted data and a first key identifier. The data encryption request is used for requesting a data key corresponding to the first key identifier and encrypting the to-be-encrypted data by using the data key.

Step S402: The processing server transmits the first key identifier to the hardware security module server, so that the hardware security module server obtains a root key corresponding to the first key identifier from the hardware security module, and encrypts the root key to generate a master key.

The hardware security module server (HSM) may be one example of an encryption server. The HSM server may be a server corresponding to a hardware security module (i.e., HSM). The HSM may be one example of an encryption machine. The HSM server may be configured to control the hardware security module and provide a service response to the processing server (e.g., the Key Management System (KMS) server).

In this embodiment of this application, the first key identifier to be transmitted to the HSM server may be packaged in a key obtaining request and transmitted to the HSM server. The HSM server parses the key obtaining request to obtain the first key identifier, and obtains a root key corresponding to the first key identifier from the hardware security module according to the first key identifier. After the HSM server obtains the root key from the corresponding hardware security module, the HSM server encrypts the root key to obtain the master key. The root key is stored in the hardware security module and is invisible to the user.

Step S403: The processing server receives the master key transmitted by the hardware security module server.

The hardware security module server obtains the root key corresponding to the first key identifier from the hardware security module, encrypts the root key to generate the master key, and after generating the master key, transmits the generated master key to the processing server, so that the processing server further generates a data key for data encryption according to the master key generated by the hardware security module server.

In some embodiments, the processing server and the hardware security module server may transmit data with each other through wireless communication, the processing server and the hardware security module server may be deployed at different locations, and the hardware security module server transmits the master key to the processing server through wireless communication. In some other embodiments, the processing server and the hardware security module server may transmit data with each other through wired communication, the processing server and the hardware security module server may be deployed at the same location, and the hardware security module server transmits the master key to the processing server through wired communication.

In some embodiments, the hardware security module server and the hardware security module may transmit data with each other either through wireless communication or through wired communication.

Step S404: The processing server encrypts the master key to generate a data key.

After encrypting the root key to obtain the master key, the hardware security module server transmits the master key to the processing server, and then the processing server further encrypts the master key to generate the data key.

The process of encrypting the root key by the hardware security module server may be implemented by any encryption method, and the process of encrypting the master key by the processing server may also be implemented by any encryption method. The process of encrypting the root key by the hardware security module server and the process of encrypting the master key by the processing server are not limited in the embodiments of this application.

Step S405: Encrypt to-be-encrypted data by using the data key to obtain encrypted data.

In the embodiments of this application, after the data key is obtained, the data key is used as a key for encryption by the user, to implement the process of encrypting the to-be-encrypted data. The data key obtained in the embodiments of this application includes key plaintext, but also includes key ciphertext, where the key plaintext is used for data encryption, and the key ciphertext is used for storage, so that subsequently the key ciphertext can be directly found in a database according to the first key identifier, and the data decryption process can be performed based on the found key ciphertext.

In the data processing method provided by the embodiments of this application, the processing server in the data processing system transmits a first key identifier to the hardware security module server, the hardware security module server obtains a root key corresponding to the first key identifier from the hardware security module and encrypts the root key to generate a master key, and the processing server encrypts the master key to generate a data key and encrypts the to-be-encrypted data by using the data key. In this way, through the interaction between the processing server, the hardware security module server, and the hardware security module in the data processing system, a highly reliable data key is generated, so that the processing server in the data processing system can accurately and effectively encrypt data to be encrypted by using the generated data key, thereby improving the accuracy of data encryption and the security of the data processing process. In addition, through the interaction between the processing server, the hardware security module server, and the hardware security module in the data processing system, use of the hardware security module can be realized through the processing server in the data processing system. Therefore, it can be ensured that any user can use the hardware security module in the data processing system through the processing server of the embodiments of this application, thereby reducing the costs of using the hardware security module, shortening the development cycle of the program for using the hardware security module, and improving user experience.

Figure 5:
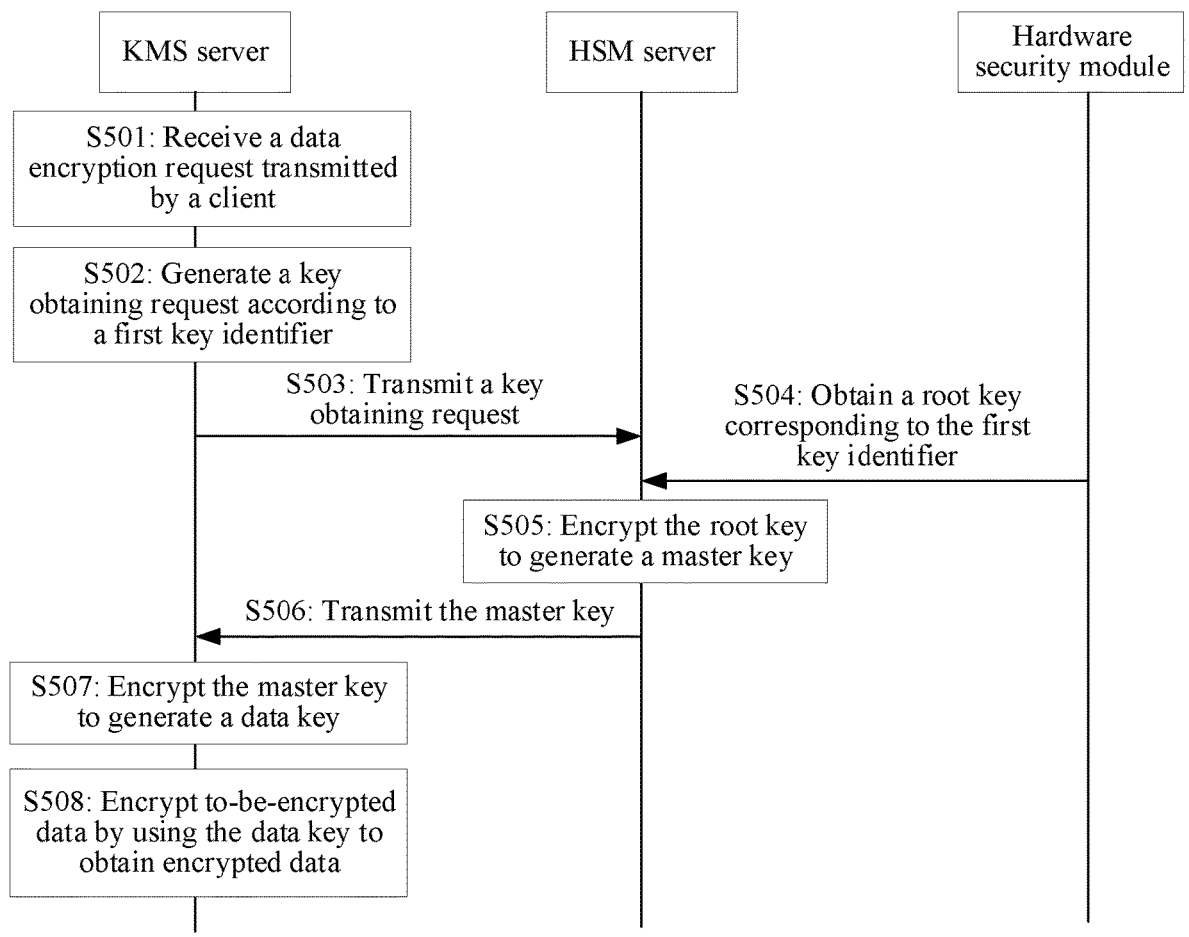
FIG. 5 is an example schematic flowchart of a data processing method according to an embodiment of this application.

In some embodiments, the data processing method is applicable to a data processing system, where the data processing system includes at least a KMS server, an HSM server, and a hardware security module. FIG. 5 is an example schematic flowchart of a data processing method according to an embodiment of this application. As shown in FIG. 5, the method includes the following steps:

Step S501: A KMS server receives a data encryption request transmitted by a client.

The data encryption request includes to-be-encrypted data and a first key identifier. The data encryption request is used for requesting to encrypt the to-be-encrypted data. In the embodiments of this application, because the data key may be used during encryption of the to-be-encrypted data, i.e., the to-be-encrypted data may be encrypted using the data key, and the data key may be determined before the encryption process is implemented.

Step S502: The KMS server generates a key obtaining request according to the first key identifier, the key obtaining request including the first key identifier.

The key obtaining request is used for requesting the HSM server for the key corresponding to the first key identifier, that is, requesting a master key, where the master key is obtained from encryption of a root key.

In the embodiments of this applications, the generation of the key obtaining request by the KMS server may be packaging the first key identifier in the key obtaining request and transmitting the key obtaining request to the hardware security module server in the data processing system.

Step S503: The KMS server transmits the key obtaining request to an HSM server.

After receiving the key obtaining request, the HSM server parses the key obtaining request to obtain the first key identifier packaged in the key obtaining request.

Step S504: The HSM server obtains a root key corresponding to the first key identifier from an HSM.

The HSM server first parses the key obtaining request to obtain the first key identifier, and then obtains the root key corresponding to the first key identifier from the HSM.

The HSM server may correspond to one or more HSMs. If the HSM server corresponds to multiple HSMs, the HSM server, after obtaining the first key identifier, may first determine an HSM in which the root key corresponding to the first key identifier is stored to determine a target HSM, and then transmit a root key obtaining request to the target HSM, to request the root key from the target HSM.

In some embodiments, when the root key corresponding to the first key identifier is stored in multiple HSMs, the HSM server may determine an HSM from the multiple HSMs as the target HSM; or determine the HSM in an idle state as the target HSM, or, determine a number of root key obtaining requests currently pending for each HSM, and determine the HSM with a minimum number of root key obtaining requests as the target HSM.

Step S505: The HSM server encrypts the root key to generate a master key.

The master key is obtained from encryption of the root key. Because the root key is completely isolated for the user, the user cannot obtain the original text of the root key. Therefore, when the key corresponding to the first key identifier is requested, the HSM server first obtains the root key, then encrypts the root key to obtain the master key, and transmits the master key to the KMS server.

Step S506: The HSM server transmits the master key to the KMS server.

The HSM server may transmit the master key to the KMS server through wireless communication or wired communication.

Step S507: The KMS server encrypts the master key to generate a data key.

The process of encrypting the root key by the HSM server may be implemented by any encryption method, and the process of encrypting the master key by the KMS server may also be implemented by any encryption method. The process of encrypting the root key by the HSM server and the process of encrypting the master key by the KMS server are not limited in the embodiments of this application.

Step S508: The KMS server encrypts the to-be-encrypted data by using the data key to obtain encrypted data.

In the data processing method provided by the embodiments of this application, through the interaction between the KMS server, the HSM server, and the hardware security module, the user can use the hardware security module through a client corresponding to the KMS server, the root key is obtained from the hardware security module, and further the final data key is obtained according to the root key to implement the encryption of the to-be-encrypted data. In this way, use of the hardware security module can be realized through the KMS server in the data processing system. Therefore, it can be ensured that any user can use the hardware security module through the KMS server, thereby reducing the costs of using the hardware security module, shortening the development cycle of the program for using the hardware security module, and improving user experience. In addition, because the obtained root key is not directly used for data encryption, but instead, is encrypted by the HSM server and the KMS server in sequence, the final data key obtained is of higher security, making the data encryption process more secure and reliable.

Figure 6:
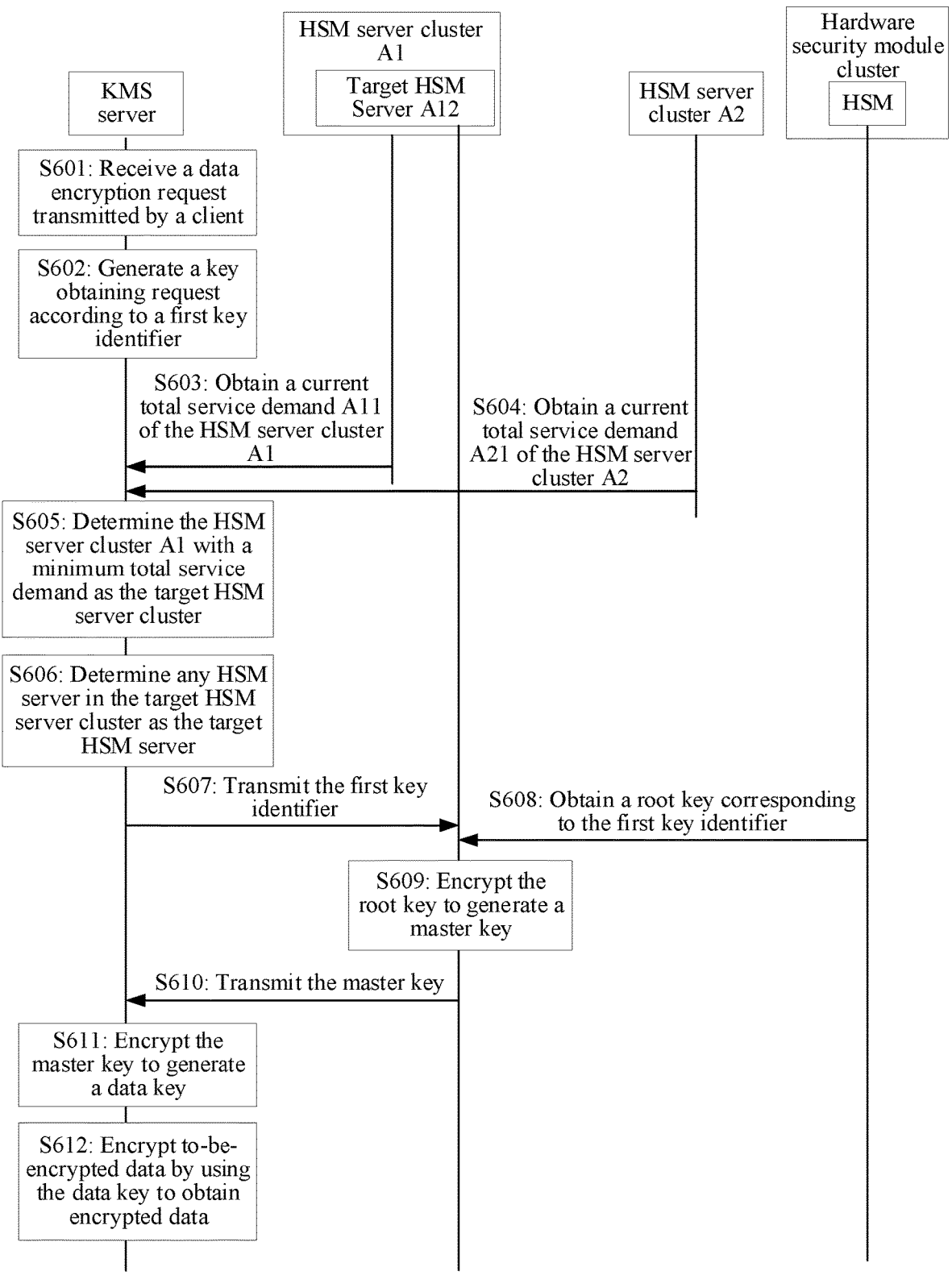
FIG. 6 is an example schematic flowchart of a data processing method according to an embodiment of this application.

In some embodiments, the data processing method is applicable to a data processing system, where the data processing system includes at least a KMS server, a plurality of HSM server clusters, and a hardware security module cluster. FIG. 6 is an example schematic flowchart of a data processing method according to an embodiment of this application. As shown in FIG. 6, assuming that the HSM server clusters include two HSM server clusters (an HSM server cluster A1 and an HSM server cluster A2 in FIG. 6), the method includes the following steps:

Step S601: A KMS server receives a data encryption request transmitted by a client.

The data encryption request includes to-be-encrypted data and a first key identifier.

Step S602: The KMS server generates a key obtaining request according to the first key identifier, the key obtaining request including the first key identifier.

Steps S601 and S602 are the same as steps S501 and S502 described above, so the details will not be repeated herein.

Step S603: The KMS server obtains a current total service demand A11 of the HSM server cluster A1.

The HSM server cluster A1 includes multiple HSM servers, and all the HSM servers in the same HSM server cluster may be deployed in the same region, or may be deployed in different regions.

The total service demand is a sum of service demands of all the HSM servers in the HSM server cluster, where the service demand may be a quantity corresponding to any service such as a key requesting service or a data encryption service.

Step S604: The KMS server obtains a current total service demand A21 of the HSM server cluster A2. The total service demand A11 is less than the total service demand A21.

The HSM server cluster A2 is an HSM server cluster different from the HSM server cluster A1. The HSM server cluster A2 also includes a plurality of HSM servers.

Step S605: The KMS server determines the HSM server cluster A1 with a minimum total service demand is the target HSM server cluster.

The KMS server compares the total service demand of each HSM server cluster, and determines the HSM server cluster with the minimum total service demand is the target HSM server cluster. In the embodiments of this application, it is assumed that the HSM server cluster A1 has the minimum total service demand.

Step S606: Determine any HSM server in the target HSM server cluster is the target HSM server.

Because the target HSM server cluster is the HSM server cluster with the minimum total service demand, the current service demands of the HSM servers in the target HSM server cluster are small, and an HSM server may be determined in the target HSM server cluster as a target HSM server responding to the current data encryption request. In the embodiments of this application, an HSM server may be selected from the target HSM server cluster as the target HSM server, or an HSM server may be selected from the target HSM server cluster as the target HSM server according to a preset selection policy.

Step S607: Transmit the first key identifier to the target HSM server A12.

In this application, the selected target HSM server A12 is taken as an example for description. The target HSM server A12 is the HSM server currently used for responding to the data encryption request. Therefore, the KMS server transmits the first key identifier to the target HSM server A12.

Step S608: The target HSM server A12 obtains a root key corresponding to the first key identifier from an HSM corresponding to the target HSM server A12.

In the embodiments of this application, each HSM server corresponds to at least one HSM, and is configured to manage and schedule the corresponding HSM(s), so as to obtain the root key from a corresponding HSM.

Step S609: The target HSM server A12 encrypts the root key to generate a master key.

The master key is obtained from encryption of the root key. Because the root key is completely isolated for the user, the user cannot obtain the original text of the root key. Therefore, when the key corresponding to the first key identifier is requested, the target HSM server A12 first obtains the root key from an HSM corresponding to the target HSM server A12, then encrypts the root key to obtain the master key, and transmits the master key to the KMS server.

Step S610: The target HSM server A12 transmits the master key to the KMS server.

Step S611: The KMS server encrypts the master key to generate a data key.

Step S612: The KMS server encrypts the to-be-encrypted data by using the data key to obtain encrypted data.

Steps S609 to S612 are the same as steps S505 to S508 described above, so the details will not be repeated herein.

The data processing method provided by the embodiments of this application is applicable to a data processing system including multiple HSM server clusters and a hardware security module cluster. An HSM server cluster with a minimum total service demand may be selected from the multiple HSM server clusters, and a target HSM server may be selected from the HSM server cluster. In this way, a load balance is achieved among the multiple HSM server clusters, so that multiple HSM servers in the data processing system can implement data encryption more stably and efficiently.

In the embodiments of this application, for the data processing system, the multiple HSM server clusters may be deployed in any region, and the HSM server cluster deployed in each region includes multiple HSM servers. As such, a huge HSM server network is formed, which can quickly respond to different data encryption requests, thereby improving user experience.

Figure 7:
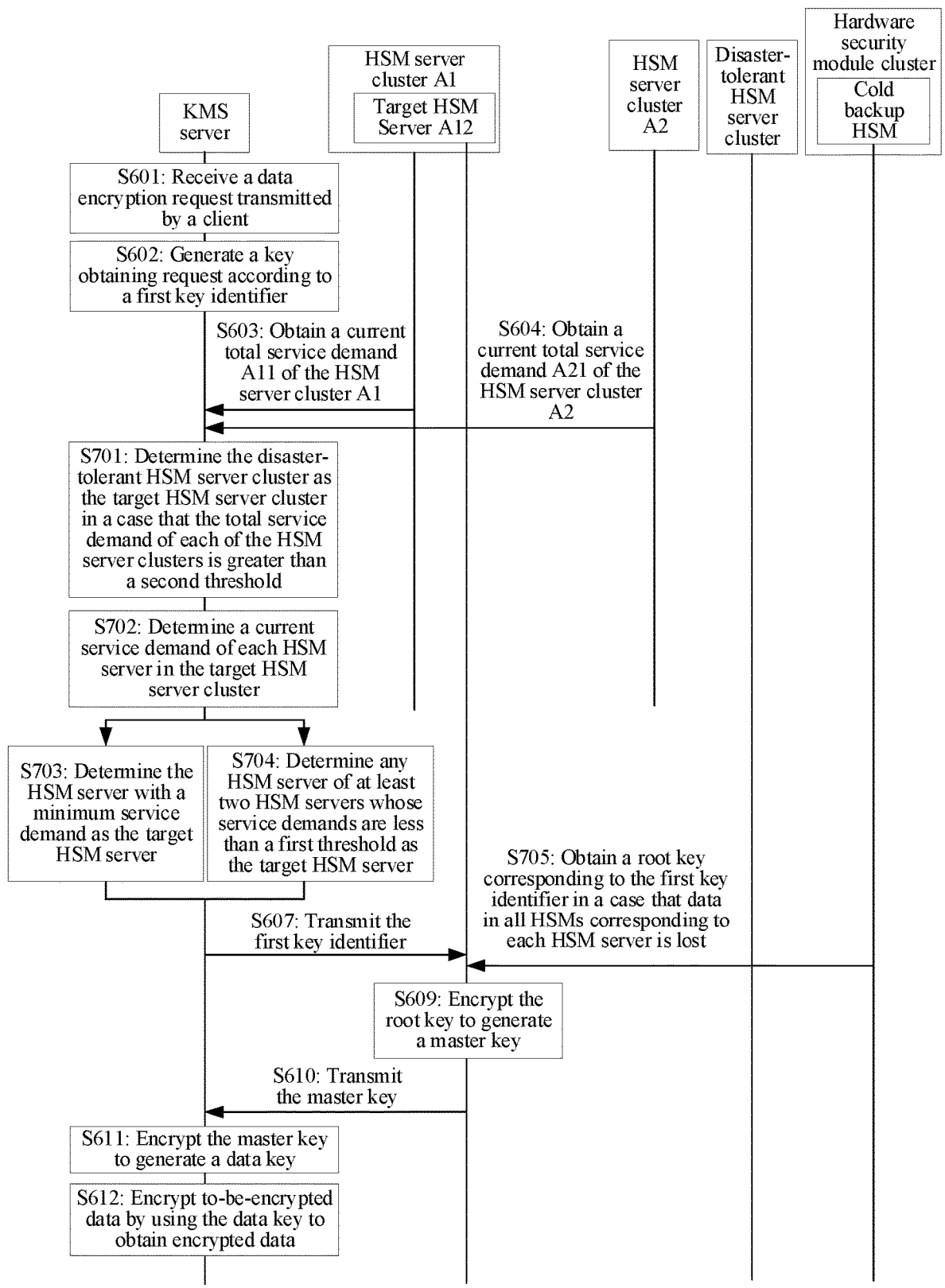
FIG. 7 is an example schematic flowchart of a data processing method according to an embodiment of this application.

In some embodiments, the data processing method is applicable to a data processing system, where the data processing system includes at least a KMS server, a plurality of HSM server clusters, a hardware security module cluster, and disaster-tolerant HSM server cluster. Based on FIG. 6, FIG. 7 is an example schematic flowchart of a data processing method according to an embodiment of this application. As shown in FIG. 7, assuming that the HSM server clusters include two HSM server clusters (an HSM server cluster A1 and an HSM server cluster A2 in FIG. 7) and a disaster-tolerant HSM server cluster A3, after step S604, step S605 may be implemented by the following step:

Step S701: The KMS server determines the disaster-tolerant HSM server cluster is the target HSM server cluster when the total service demand of each of the HSM server clusters is greater than a second threshold.

When the total service demand of each HSM server cluster is greater than the second threshold, it indicates that the total service demands of the current HSM server clusters are large, and the current HSM server clusters are heavily loaded and cannot effectively process a data encryption request in a timely manner. In some embodiments, the disaster-tolerant HSM server cluster may be started for data processing to achieve load balancing and disaster recovery.

Correspondingly, step S606 may be implemented by the following steps S702 and S703, or S704:

Step S702: Determine a current service demand of each HSM server in the target HSM server cluster.

Step S703: Determine the HSM server with a minimum service demand is the target HSM server.

Step S704: Determine any HSM server of at least two HSM servers whose service demands are less than a first threshold is the target HSM server.

Still referring to FIG. 7, in some embodiments, the hardware security module cluster in the data processing system further includes a cold backup HSM. Correspondingly, step S608 may include the following step:

S705: The target HSM server A12 obtains a root key corresponding to the first key identifier from the cold backup HSM when data in all HSMs corresponding to each HSM server is lost.

The cold backup HSM is a term relative to a normal HSM. The cold backup HSM usually is not powered on and is locked in a safe cabinet. Once data in all the hardware security modules is lost, the data can be recovered from the cold backup hardware security module. In this way, it can be ensured that the system can operate stably under any circumstances, thereby preventing system crashes caused by the loss of a large amount of data.

Figure 8:
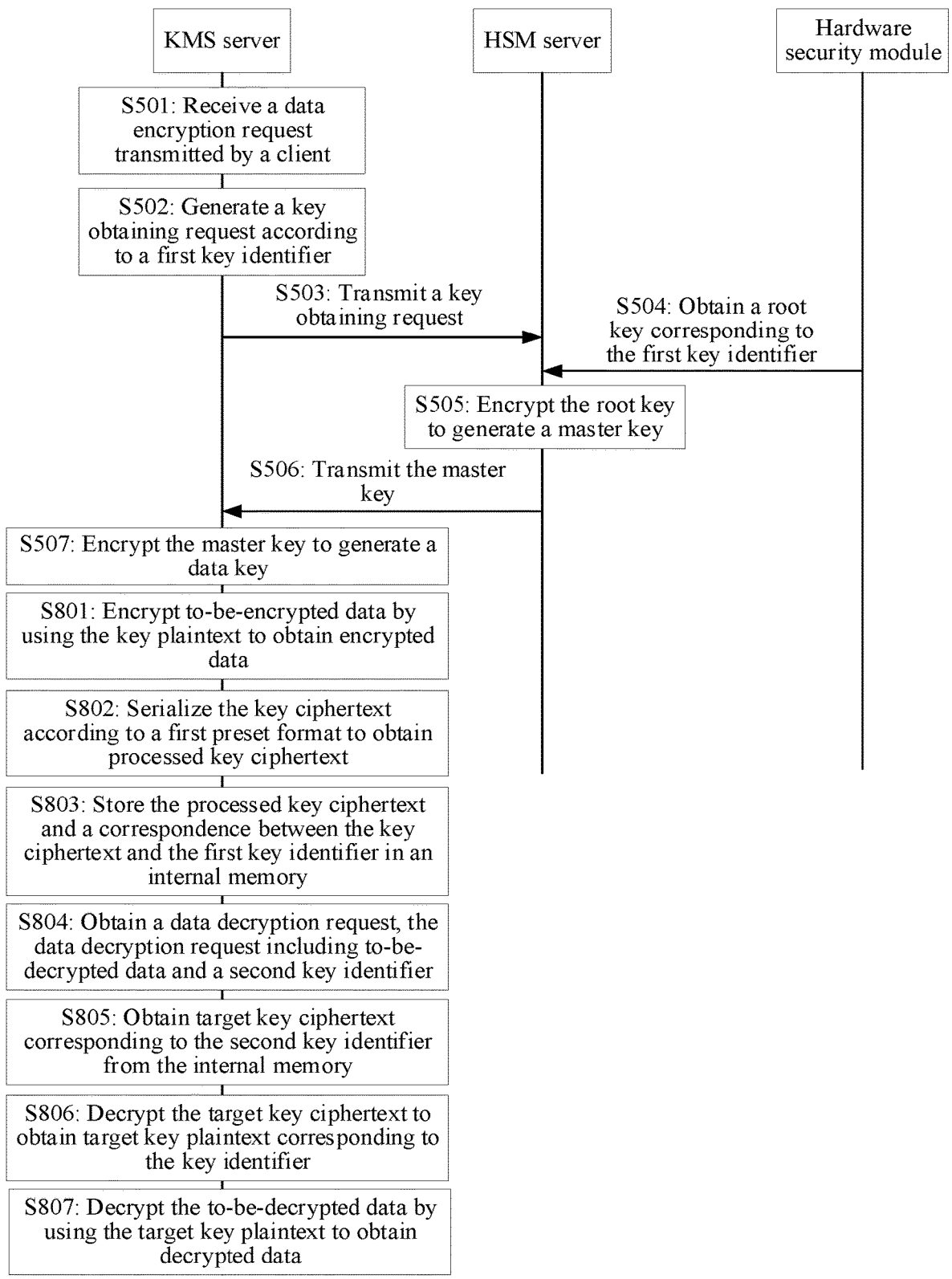
FIG. 8 is an example schematic flowchart of a data processing method according to an embodiment of this application.

In some embodiments, the data key includes key plaintext and key ciphertext. Based on FIG. 5, FIG. 8 is an example schematic flowchart of a data processing method according to an embodiment of this application. As shown in FIG. 8, step S508 may be implemented by the following step:

Step S801: The KMS server encrypts the to-be-encrypted data by using the key plaintext to obtain encrypted data In some embodiments, the method may further include the following steps:

Step S802: The KMS server serializes the key ciphertext according to a first preset format to obtain processed key ciphertext.

Serialization is a process of converting status information of an object into a form that can be stored or transmitted. During the serialization, the current state of the object is written to a temporary or persistent storage area. Serialization enables other code to view or modify object instance data that would otherwise be inaccessible without serialization.

In the embodiments of this application, the key ciphertext is converted into the first preset format by serialization, so as to meet the storage requirements of the internal memory.

Step S803: The KMS server stores the processed key ciphertext and a correspondence between the key ciphertext and the first key identifier in an internal memory.

In the embodiments of this application, a correspondence between the key ciphertext and the first key identifier is also stored in the internal memory, so that subsequently when the key ciphertext needs to be searched, the key ciphertext can be quickly found according to the key identifier and the correspondence.

In some other embodiments, a correspondence between the key ciphertext, the key ciphertext, and the first key identifier may be stored in the blockchain system.

Still referring to FIG. 8, in some embodiments, the method further includes the following decryption step:

Step S804: The KMS server obtains a data decryption request, the data decryption request including to-be-decrypted data and a second key identifier.

The key decryption request is used for requesting to decrypt the to-be-decrypted data. When the user wants to decrypt the encrypted data (that is, the to-be-decrypted data), the user transmits a data decryption request to the KMS server through the client.

In the embodiments of this application, the KMS system corresponding to the client can implement a data encryption process, and also can implement a data decryption process.

Step S805: The KMS server obtains target key ciphertext corresponding to the second key identifier from the internal memory.

During encryption of the to-be-encrypted data, the key plaintext is used for encryption, and the key ciphertext corresponding to the key plaintext is stored in the internal memory. Therefore, during decryption of the to-be-decrypted data, the obtained key ciphertext is used for data decryption. In the embodiments of this application, the to-be-decrypted data obtained through encryption may be decrypted by using the key ciphertext corresponding to the key plaintext used during the encryption. In such embodiments, the second key identifier of the target key ciphertext is the same as or corresponds to the first key identifier corresponding to the key plaintext.

In some other embodiments, the data encryption may not be performed by the user, and the user does not know the first key identifier corresponding to the key plaintext. In such embodiments, the second key identifier corresponding to the target key ciphertext may be determined by the user according to the to-be-decrypted data.

Step S806: The KMS server decrypts the target key ciphertext to obtain target key plaintext corresponding to the key identifier.

In the embodiments of this application, the obtained key ciphertext may not be directly used for data encryption and decryption, and the key ciphertext may be decrypted to obtain the key plaintext, and the data decryption can be implemented by using the key plaintext.

In some embodiments, after the target key plaintext is obtained, the target key plaintext may also be used to encrypt the data. The function of the obtained target key plaintext is not limited in the embodiments of this application.

Step S807: The KMS server decrypts the to-be-decrypted data by using the target key plaintext to obtain decrypted data.

In response to the data decryption request transmitted by the user through the client, the to-be-decrypted data is decrypted by using the obtained plaintext of the target key to obtain the decrypted data.

In the data processing method provided by the embodiments of this application, data decryption can further be implemented, and through the interaction between the KMS server, the HSM server, and the hardware security module in the data processing system, use of the hardware security module to implement the data decryption process can be realized through the KMS server in the data processing system. Therefore, it can be ensured that any user can use the hardware security module for data decryption through the KMS server, thereby reducing the costs of using the hardware security module, shortening the development cycle of the program for using the hardware security module, and improving user experience.

Figure 9:
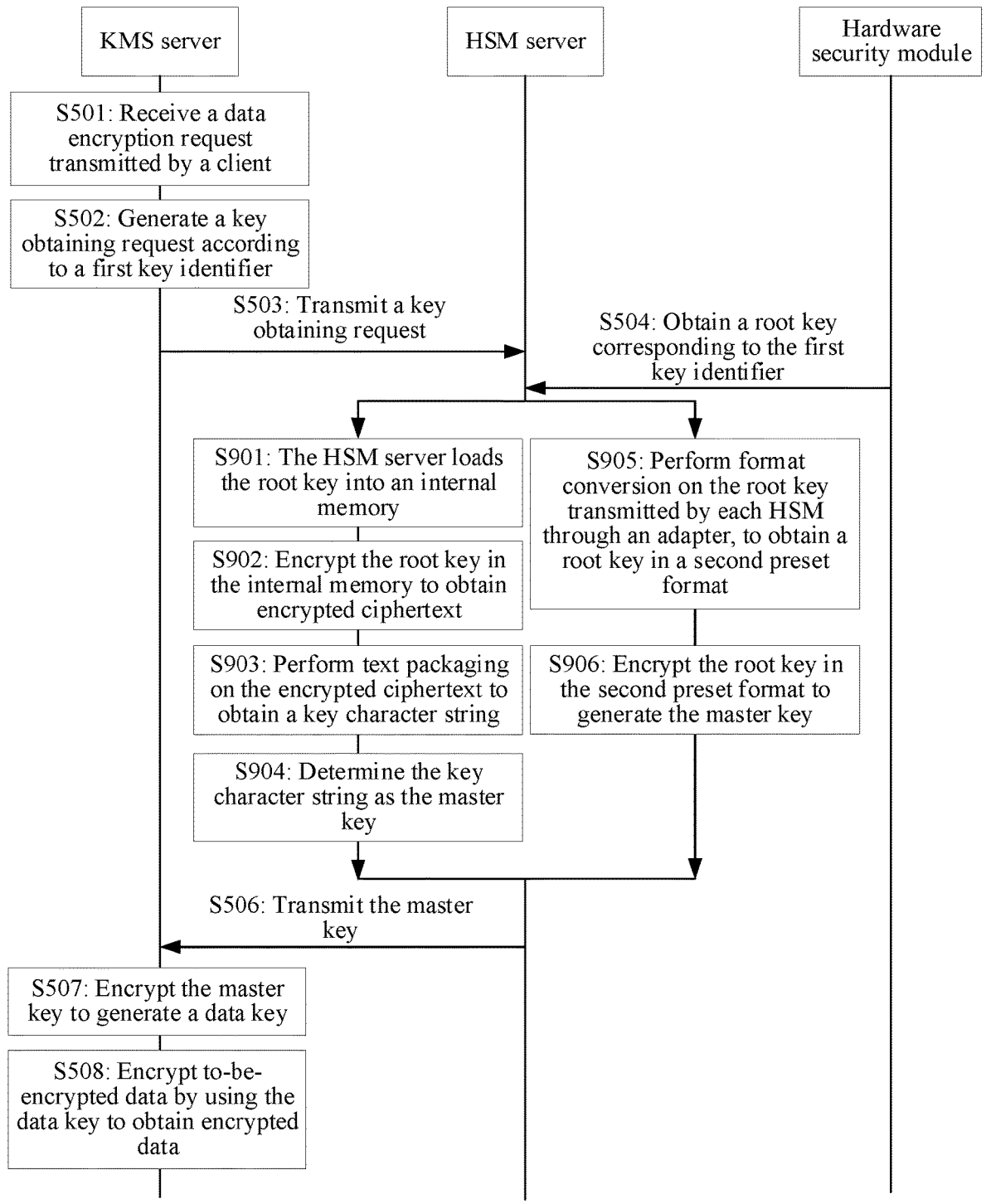
FIG. 9 is an example schematic flowchart of a data processing method according to an embodiment of this application.

Based on FIG. 5, FIG. 9 is an example schematic flowchart of a data processing method according to an embodiment of this application. As shown in FIG. 9, step S505 may be implemented by the following steps:

Step S901: The HSM server loads the root key into an internal memory.

Loading the root key into the internal memory may be storing the root key in the internal memory, so that in the subsequent process of encrypting the root key, the loss of the root key can be avoided.

Step S902: Encrypt the root key in the internal memory to obtain encrypted ciphertext.

The root key may be encrypted using any encryption algorithm or encryption method to obtain the encrypted ciphertext. In some embodiments, the HSM and the HSM server may communicate with each other via the Transport Layer Security (TLS) protocol. The TLS protocol can be used to provide confidentiality and data integrity between two communication applications, so as to ensure the confidentiality and data integrity of the root key during the process of loading the root key from the HSM into the internal memory.

Step S903: Perform text packaging on the encrypted ciphertext to obtain a key character string.

A wrap function may be used to perform text packaging on the encrypted ciphertext. The text packaging is packaging the encrypted ciphertext into a character string in a desired format. In the embodiments of this application, text packaging is performed on the encrypted ciphertext to obtain a key character string in a desired format.

Step S904: Determine the key character string as the master key.

In some embodiments, Because the hardware security modules in the data encryption system may be from different manufacturers, adaptation processing is required for different types of hardware security modules in the same data encryption system, so that users can use different hardware security modules to implement encryption of the same to-be-encrypted data and decryption of the same to-be-decrypted data. The adaptation processing process includes the following step (that is, before step S505, the method may further include the following step):

Step S905: Perform format conversion on the root key transmitted by each HSM through an adapter, to obtain a root key in a second preset format, the second preset format being a unified format output by the HSM.

In the embodiments of this application, each hardware security module corresponds to one adapter, or each HSM server corresponds to one adapter. The adapter converts the format of the root key transmitted by the HSM into a unified format, i.e., the second preset format.

In the embodiments of this application, each HSM server further provides an adaptation service. The adaptation service corresponds to one adapter, and the adaptation service is implemented by the adapter.

Correspondingly, step S505 may also be implemented by the following step: Step S906: Encrypt the root key in the second preset format to generate the master key.

In the data processing method provided by the embodiments of this application, the adapters are used to convert the formats of the root keys of different types of hardware security modules, so that even if different hardware security modules are used, root keys of the unified second preset format can be output, thereby ensuring the compatibility between the adapters. In this way, one data processing system can provide services for more users with different needs, which meets the users' needs of diversified services and improves user experience.

The following describes an example application of this embodiment in an application scenario.

The embodiments of this application provide a data processing method, and propose a multi-tenant key security management solution based on a cloud platform, which supports subscription to a KMS service on the cloud platform and changes the conventional method of using hardware security modules, thereby solving the problems that the conventional method of using hardware security modules requires high costs that ordinary users cannot afford and a long development cycle and does not support dynamic expansion, and solving the security problem of conventional encryption methods.

Figure 10:
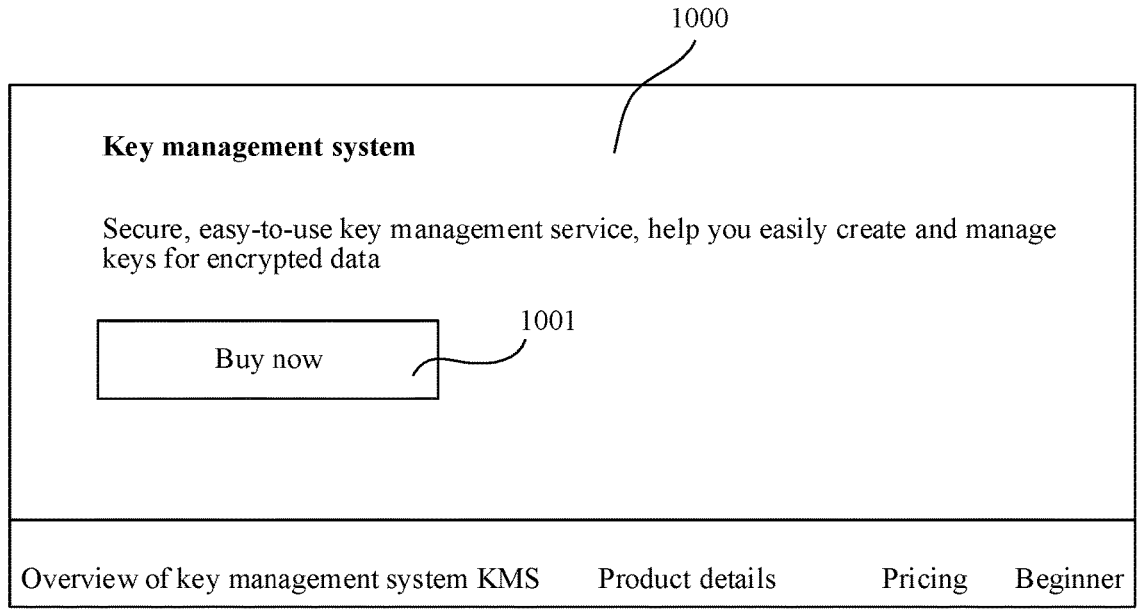
FIG. 10 is an interface diagram showing subscription to a KMS service according to an embodiment of this application.

On the product side, as shown in FIG. 10 which is an interface diagram showing subscription to a KMS service according to an embodiment of this application, when needing to subscribe to a KMS service on an official website of the cloud platform, the user clicks or taps a "buy now" button 1001 on a subscription interface 1000 to subscribe to the service.

Figure 11:
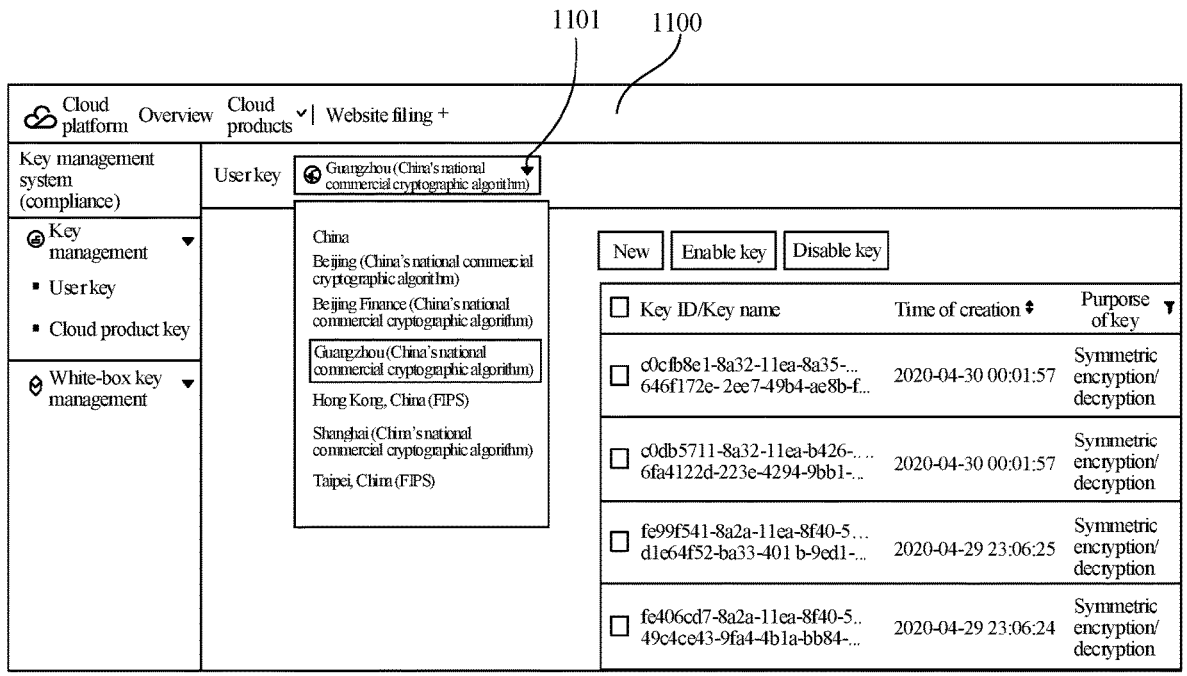
FIG. 11 is a schematic diagram of a console interface for creating a key according to an embodiment of this application.

FIG. 11 is a schematic diagram of a console interface for creating a key according to an embodiment of this application. As shown in FIG. 11, the user enters a console interface 1100 of his own cloud platform to create a key, where a key created in a region of China complies with China's national commercial cryptographic algorithms, and a key created in a foreign region complies with FIPS. The user may select a region for which the service may be subscribed to by clicking or tapping a region selection button 1101.

Figure 12:
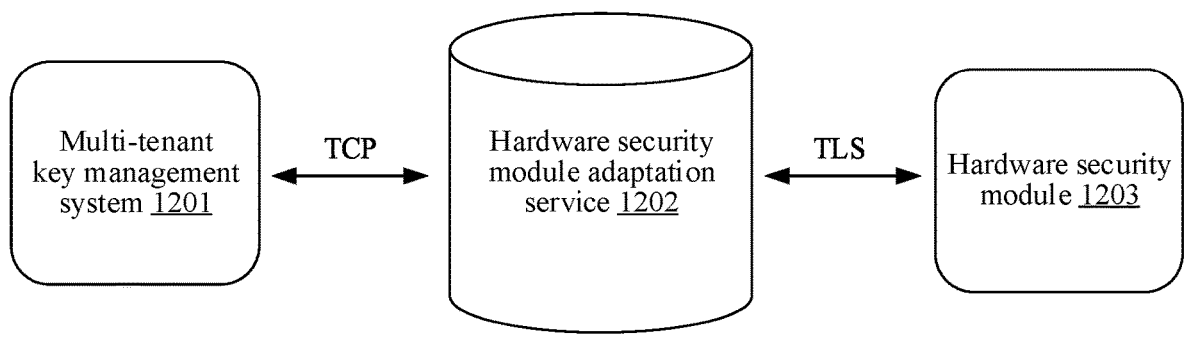
FIG. 12 is a block diagram of a data processing system according to an embodiment of this application.

On the technical side, the user may connect to a multi-tenant key management system of a public cloud through a cloud application programming interface (API), through which the security of sensitive service information is ensured. and the key management system uses a hardware security module adaptation service to ensure the access to hardware security modules in different regions, thereby ensuring the security of sensitive service information through the hardware security modules. FIG. 12 is a block diagram of a data processing system according to an embodiment of this application. As shown in FIG. 12, the data processing system includes a multi-tenant key management system 1201, a hardware security module adaptation service 1202, and a hardware security module 1203. The multi-tenant key management system 1201 is configured to provide a platform for key management to multiple users, so that users can implement key management of the hardware security module on this platform. The hardware security module adaptation service 1202 is a service that connects the multi-tenant key management system 1201 and the hardware security module 1203, and may interact with the multi-tenant key management system 1201 through the TCP protocol and interact with the hardware security module 1203 through the TLS protocol. The hardware security module 1203 is a special machine manufactured in accordance with China's national and international standards. The hardware security module has the following advantages to ensure the security of keys: the hardware security module is a customized machine of which the structure and software are fixed before delivery from the factory, and does not support the installation of third-party application software, thereby avoid the security risks caused by low-version third-party software; different from ordinary servers, the hardware security module disables most of ports and enables specific ports, thereby reducing the risk of being invaded due to improper enabling of ports; the hardware security module has a unique security protection system, and when the login fails for N times (for example, N equals 10), a self-destruction process is started to delete all the keys stored in the hardware security module, so that hackers cannot steal the keys by brute-force cracking; the hardware security module supports communication via HTTPS and requires two-way certificate authentication, which are set during initialization of the hardware security module, and the configuration of a login whitelist prevent hackers from using other machines to log in to the hardware security module; the key is stored in the hardware security module, and the original text of the key cannot be obtained even if the two-way protocol authentication is passed. Therefore, using the hardware security module can ensure the security of users' keys.

Figure 13:
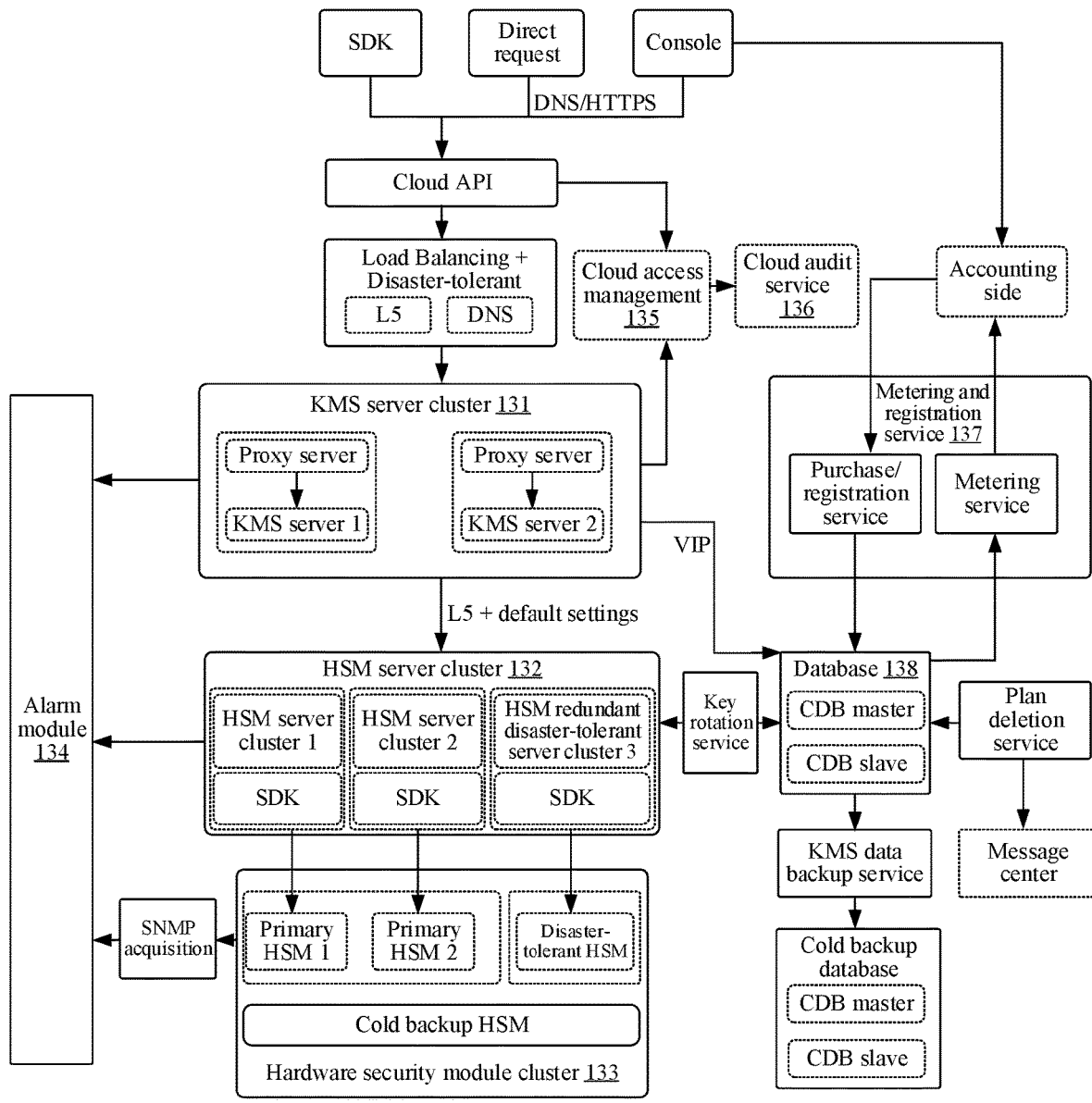
FIG. 13 is an overall architectural diagram of a multi-tenant key management system according to an embodiment of this application.

FIG. 13 is an overall architectural diagram of a multi-tenant key management system according to an embodiment of this application. As shown in FIG. 13, the deployment of hardware security modules and hardware security module servers in clusters is carried out in a two-location three-center disaster-tolerant manner. The multi-tenant key management system as a whole includes: a KMS server cluster 131, an HSM server cluster 132, a hardware security module cluster 133. The HSM server cluster 132 includes an HSM server cluster 1, an HSM server cluster 2, and a redundant disaster-tolerant HSM server cluster 3. The hardware security module cluster 133 includes a primary HSM 1, a primary HSM 2, a disaster-tolerant HSM, and a cold backup HSM. The HSM server cluster 1 communicates with the primary HSM 1 through an SDK. The HSM server cluster 2 communicates with the primary HSM 2 through an SDK. The redundant disaster-tolerant HSM server cluster 3 communicates with the disaster-tolerant HSM through an SDK. The cold backup HSM is a special device, which usually is not powered on and is locked in a safe cabinet. Once data in all the HSMs is lost, the data can be recovered from the cold backup HSM.

The HSM is connected to an ordinary server and provides an interface-level consistency service to a KMS. The KMS server cluster 131 is connected to the KMS server 1 or the KMS server 2 through a proxy server (which, for example, may be an nginx server, i.e., a high-performance HTTP and reverse proxy web server).

The KMS manages data in a database (DB), uses the functions of the hardware security module service to realize the key rotation and management functions, makes direct requests based on the Domain Name System Protocol (DNS) or HTTPS, uses a cloud application programming interface, uses L5 (lowest priority device for level 5 response) and DNS for load balancing and disaster recovery, and provides interface responses to pages and SDKs.

An alarm module 134 is configured to monitor the running state of the entire system, and can realize second-level notification when there is an abnormality.

A cloud access management (CAM) 135 provides a fine-granularity authentication service, and can grant different permissions according to different sub-accounts of users to achieve permission isolation.

A cloud audit service 136 provides an audit function to ensure that all key operations on the system are traceable.

A metering and subscription service 137 is configured to implement different accounting mechanisms according to the user's dynamic expansion requirements, so as to meet the user's usage requirements of different levels.

A database 138 includes a cloud database master (CDB master) and a cloud database slave (CDB slave). The database 138 provides data storage services to the KMS server cluster 131 based on virtual IP (VIP).

In some embodiments, the multi-tenant key management system further includes: a key rotation service, configured to implement key rotation; a plan deletion service, configured to delete plans in the system; a KMS data backup service, configured to back up data; a cold backup database, configured to perform cold backup of data, where the cold backup database also includes a cloud database master (CDB master) and a cloud database slave (CDB slave); and a message center, configured to transmit various messages, such as reminder messages or request messages.

The crucial technologies of the multi-tenant key management system will be described in detail below.

Figure 14:
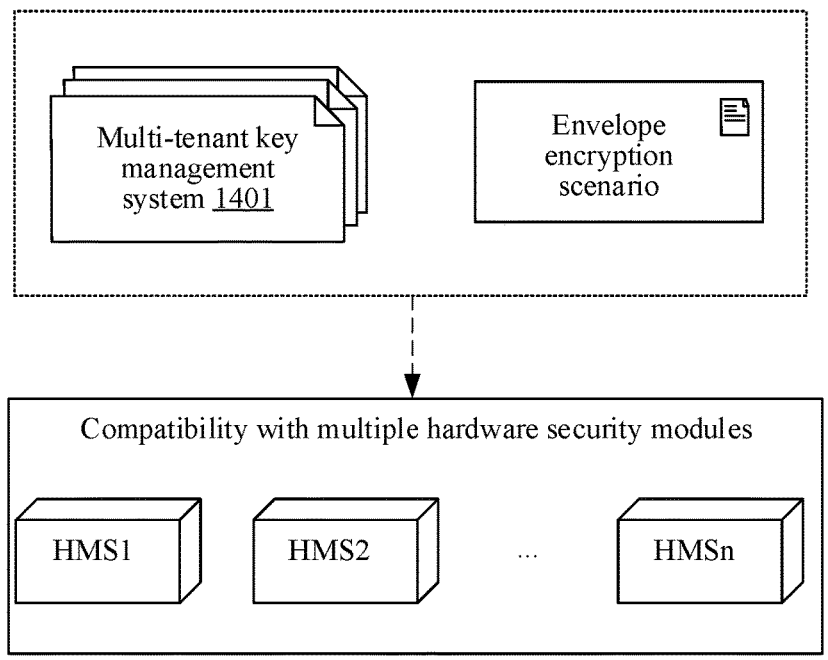
FIG. 14 is a schematic diagram of an implementation process of a data processing method according to an embodiment of this application.

FIG. 14 is a schematic diagram of an implementation process of a data processing method according to an embodiment of this application. As shown in FIG. 14, the multi-tenant key management system 1401 may be used in an envelope encryption scenario. The multi-tenant key management system 1401 is connected to multiple hardware security modules HSM1, HSM2, . . . , HSMn. The hardware security modules are compatible with each other. A multi-level key management system is proposed in the embodiments of this application. Based on the multi-level key management system (i.e., the multi-tenant key management system 1401), a usage scenario based on envelope encryption for users is derived. Finally, for the better operation of the system, a multi-manufacturer compatible hardware security module usage scheme is proposed.

Figure 15:
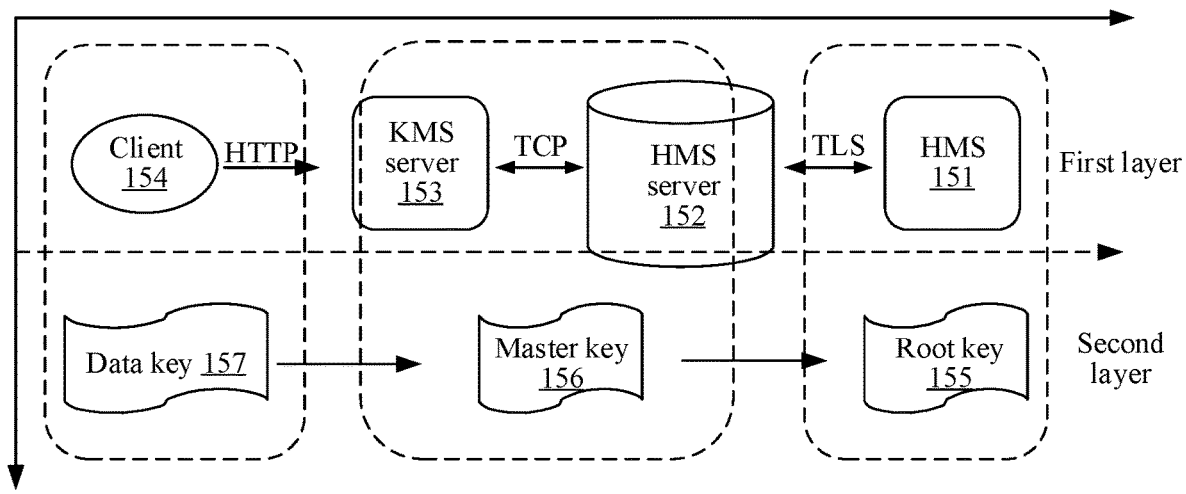
FIG. 15 is a relationship diagram of a multi-level key management system according to an embodiment of this application.

In the embodiments of this application, in the multi-level key management system, an envelope encryption scenario is satisfied. FIG. 15 is a relationship diagram of a multi-level key management system according to an embodiment of this application. An invocation relationship of a first layer in a horizontal direction in FIG. 5 is: a hardware security module 151 is configured in each region of a public cloud, a corresponding hardware security module server (HSM Server) 152 is allocated to package the invocation with the hardware security module 151, the differences between different hardware security modules are shielded, and a unified interface is provided for invocation by a KMS server 153. On a client 154, the user uses a service provided by the KMS server 153 through a standard of a cloud application programming interface. Differences between regions are shielded by an interface layer of the cloud application programming interface. By accessing a domain name of the cloud application programming interface, a user in any region can invoke a KMS server 153 in this region to provide a service.

The KMS server 153 stores information related to users as well as key indexes and ciphertext created by the users, provides an undifferentiated interface for the users, implements the life cycle management of the users' keys and personalized key management policies. The user may create different sub-accounts, for which different key management policies are assigned, to realize the separation of permissions and improve the security of keys.

Before explaining an invocation relationship of a second layer in the horizontal direction in FIG. 15, it is explained first that root keys 155 in FIG. 15 includes a Domainkey root key and a Rootkey root key, where the Domainkey root key and the Rootkey root key represent root keys in different systems. The user's master key 156 may be a CMkey master key. A data key 157 includes a Datakey data key and a DEK data key, where the master key 156 is used in the generation of the data key 157 and the root key 155 is used in the generation of the master key 156. In the embodiments of this application, the root key 155 is stored in the hardware security module, and therefore is protected to the highest standards. That is, the root key 155 is protected by the hardware security module. Then, the root key 155 is encrypted to generate the master key 156. The master key 156 is stored in a database between KMS hardware security modules. In the embodiments of this application, the user cannot obtain the original text of the master key. When the user wants to perform some encryption operations, a data key 157 may be generated according to the master key. The user obtains the data key 157, and performs some encryption and decryption operations with the data key 157. Therefore, the user cannot obtain the original text of the master key 156 and the root key. The root key is completely isolated for the user. For the master key, the user only knows an ID of the master key. The data key 157 finally used for data encryption is obtained according to the ID of the master key.

The invocation relationship of the second layer in the horizontal direction in FIG. 15 is described below: during initialization of a hardware security module, a root key is created in the hardware security module. The root key is protected by the hardware security module from being brute-force cracked or stolen. The original text of the root key is not visible to the outside, thus providing high security. The hardware security module server (i.e., the HSM server) 152 uses a hardware security module to create a key, encrypts the key with a root key to generate a master key, and provides the master key to the KMS server for management. The KMS server implements key management and key rotation functions. The user requests the KMS server to generate a data key. The data key is generated by encryption of the master key. The user obtains the original text and ciphertext of the data key. The original text is used for local encryption and decryption of the data and is stored in the internal memory. The ciphertext of the data key is serialized according to a certain format and then stored locally. When the data key needs to be used, the encrypted key is decrypted by the KMS server to obtain the data key. The data in the internal memory is decrypted with the original text of the obtained data key.

The root key is stored in the hardware security module. The original text of the root key is in the hardware security module. The root key is encrypted to generate the master key. The master key is invisible to the user, and the user can obtain only an ID of the master key. The master key is encrypted to generate a data key. The data key is actually a regenerated key, which is another key. The data key will be transmitted to the user, so the original text of the data key will be transmitted to the user. In the embodiments of this application, the data key is actually plaintext, the key is a character string (for example, a 128-bit character string), and the data key is obtained by encrypting the character string with the master key.

For a relationship in the vertical direction in FIG. 15, the root key is managed by the hardware security module, persistently stored, and backed up in a special machine; the master key is generated by the HSM server invoking the hardware security module, and stored in the database of the KMS together with the user information, and the KMS server manages the life cycle of the master key; the plaintext and ciphertext of the data key are transmitted to the user for local encryption and decryption.

Figure 16:
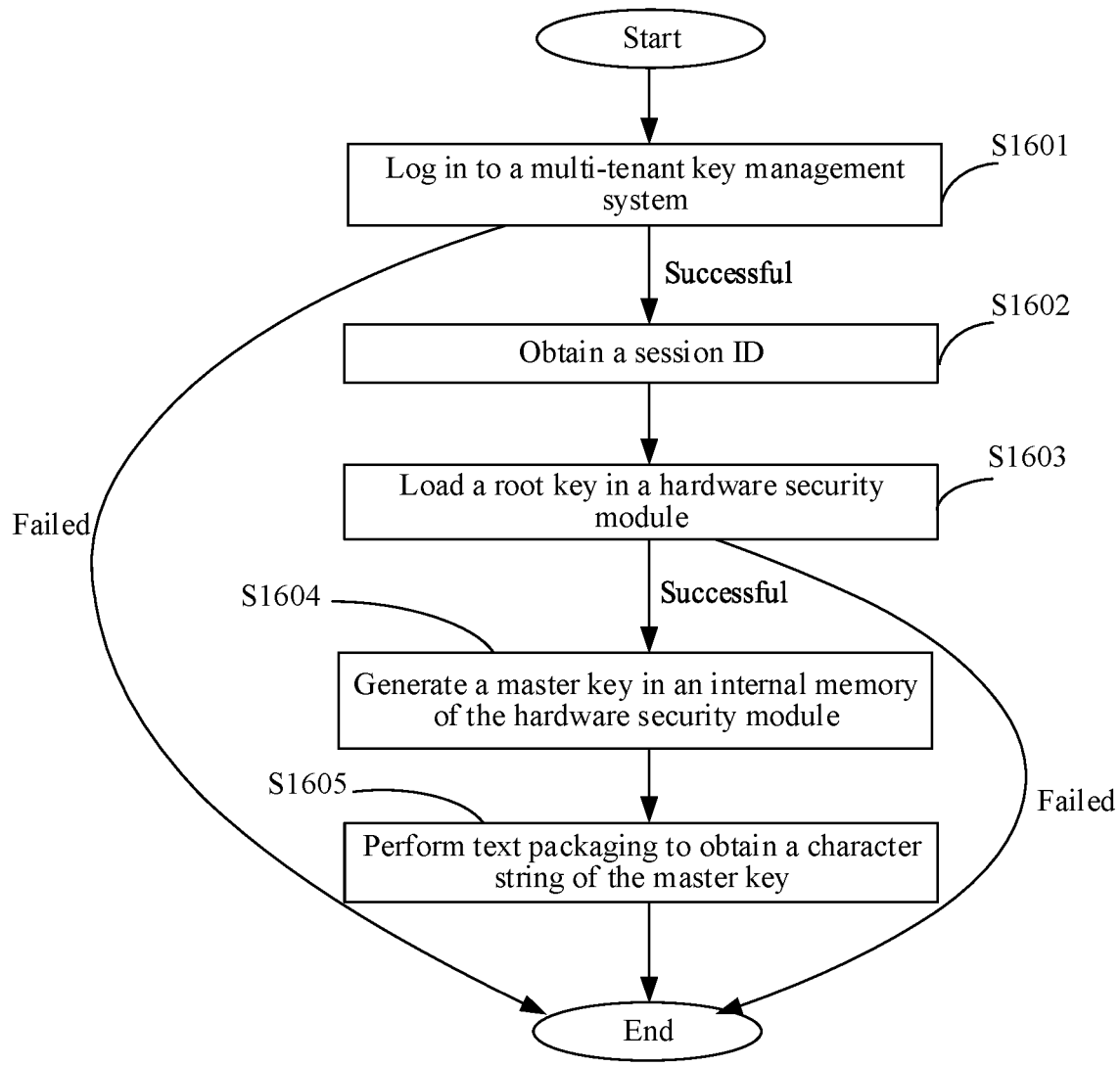
FIG. 16 is a flowchart of master key generation according to an embodiment of this application.

A process of generating a master key is used as an example below to explain the three-level key management system of the hardware security module. FIG. 16 is a flowchart of master key generation according to an embodiment of this application. As shown in FIG. 16, the method includes the following steps:

Step S1601: A user logs in to a multi-tenant key management system.

If the login fails, the process ends; if the login is successful, step S1602 is executed.

Step S1602: Obtain a session ID.

Step S1603: Load a root key corresponding to the session ID in a hardware security module.

If the loading fails, the process ends; if the loading is successful, step S1604 is executed.

Step S1604: Generate a master key in an internal memory of the hardware security module.

Step S1605: Perform text packaging (i.e., Wrap processing) on the master key to obtain a character string of the master key. In the embodiments of this application, in order to comply with the security requirements of key isolation, the key cannot be used directly, login to the hardware security module is required, and only after a correct session is obtained, an interface of the hardware security module can be invoked to load the key inside the hardware security module, to achieve encryption and decryption services for the outside. The plaintext of the master key cannot appear outside the hardware security module, so the ciphertext of the master key may be packaged inside the hardware security module and stored in the database of the KMS for the management of the life cycle of the key.

Figure 17:
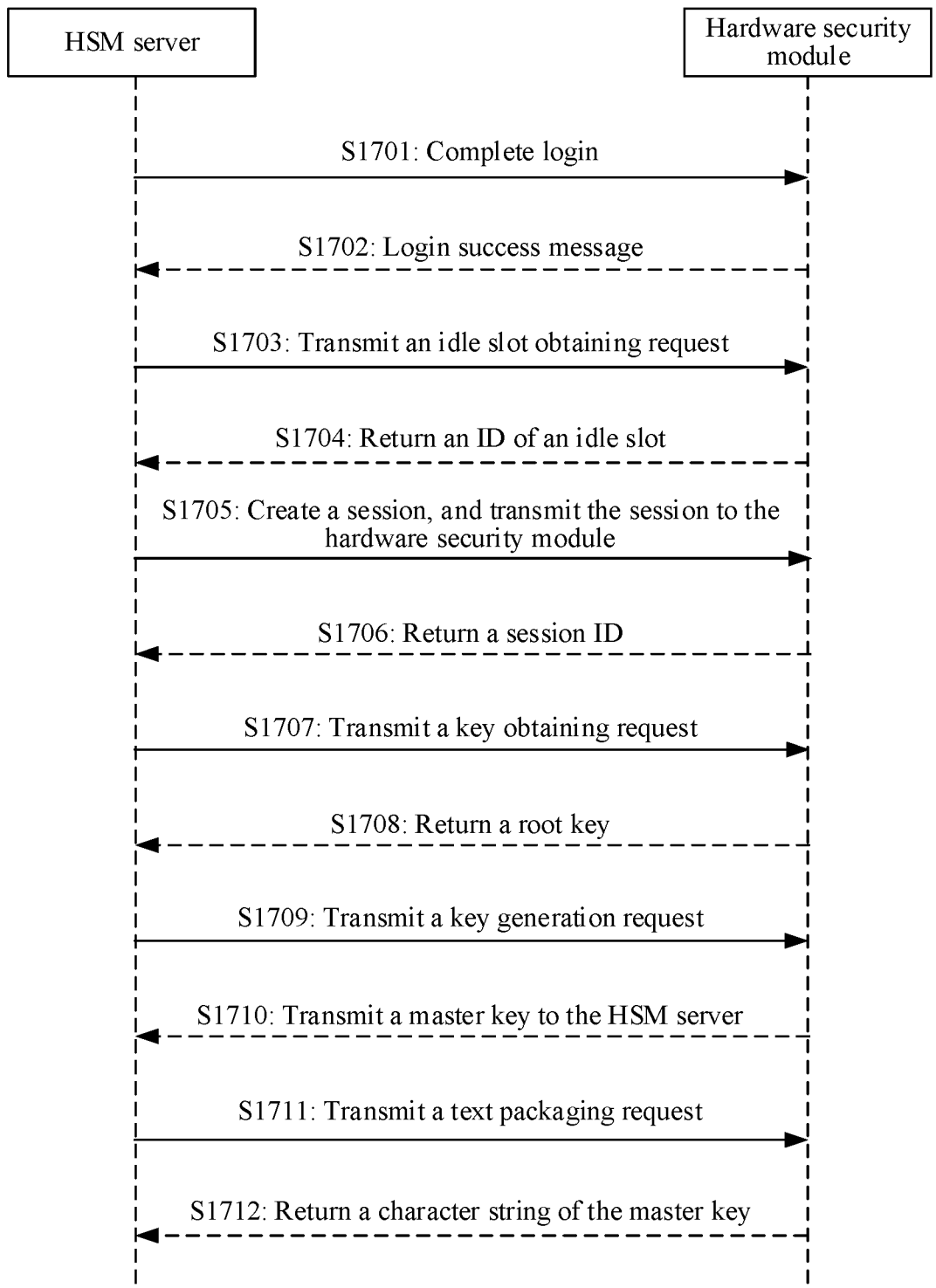
FIG. 17 is a timing diagram of interaction with a hardware security module according to an embodiment of this application.

To provide a better understanding of the process of interaction with the hardware security module, a timing diagram of interaction with a hardware security module is described by way of example, where the process of interaction with the hardware security module complies the international PKCS #11 standard (which is a public-key encryption standard developed by RSA Laboratories). As shown in FIG. 17, the interaction process between the HSM server and the hardware security module includes the following steps:

Step S1701: The HSM server completes login in the hardware security module.

Step S1702: After the login is successful, the hardware security module returns a login success message to the HSM server.

Step S1703: The HSM server transmits an idle slot obtaining request (for example, a GetSlotList message) to the hardware security module, to obtain currently idle slots in the hardware security module.

Step S1704: The hardware security module returns an ID of an idle slot to the HSM server.

Step S1705: The HSM server creates a session, and transmits the created session to the hardware security module.

Step S1706: The hardware security module returns a session ID to the HSM server.

Step S1707: The HSM server transmits a key obtaining request to the hardware security module, the key obtaining request including a key identifier.

Step S1708: The hardware security module returns a root key to the HSM server, and loads the root key corresponding to the key identifier into an internal memory.

Step S1709: The HSM server transmits a key generation request to the hardware security module.

Step S1710: The hardware security module obtains a handle of the root key, and transmits a master key to the HSM server according to the handle of the root key.

Step S1711: The HSM server transmits a text packaging request to the hardware security module.

Step S1712: The hardware security module performs text packaging on the master key to obtain a character string of the master key, and returns the character string of the master key to the HSM server.

Thus, the entire process of interaction between the HSM server and the hardware security module is complete, and the session is ended. As can be seen from FIG. 17, an input condition is the key identifier of the root key, and the output is the handle of the root key. In this way, it can be ensured that during the entire master key generation process, the plaintext of the root key exists in the internal memory of the hardware security module.

In the envelope encryption scenario based on multiple levels of keys, all the services need to be oriented to users, and a goal for the architecture is to provide users with convenient services. Therefore, based on the above multi-layer key system, it may be desirable to further solve the problem of high costs of key storage of the hardware security module.

Figure 18:
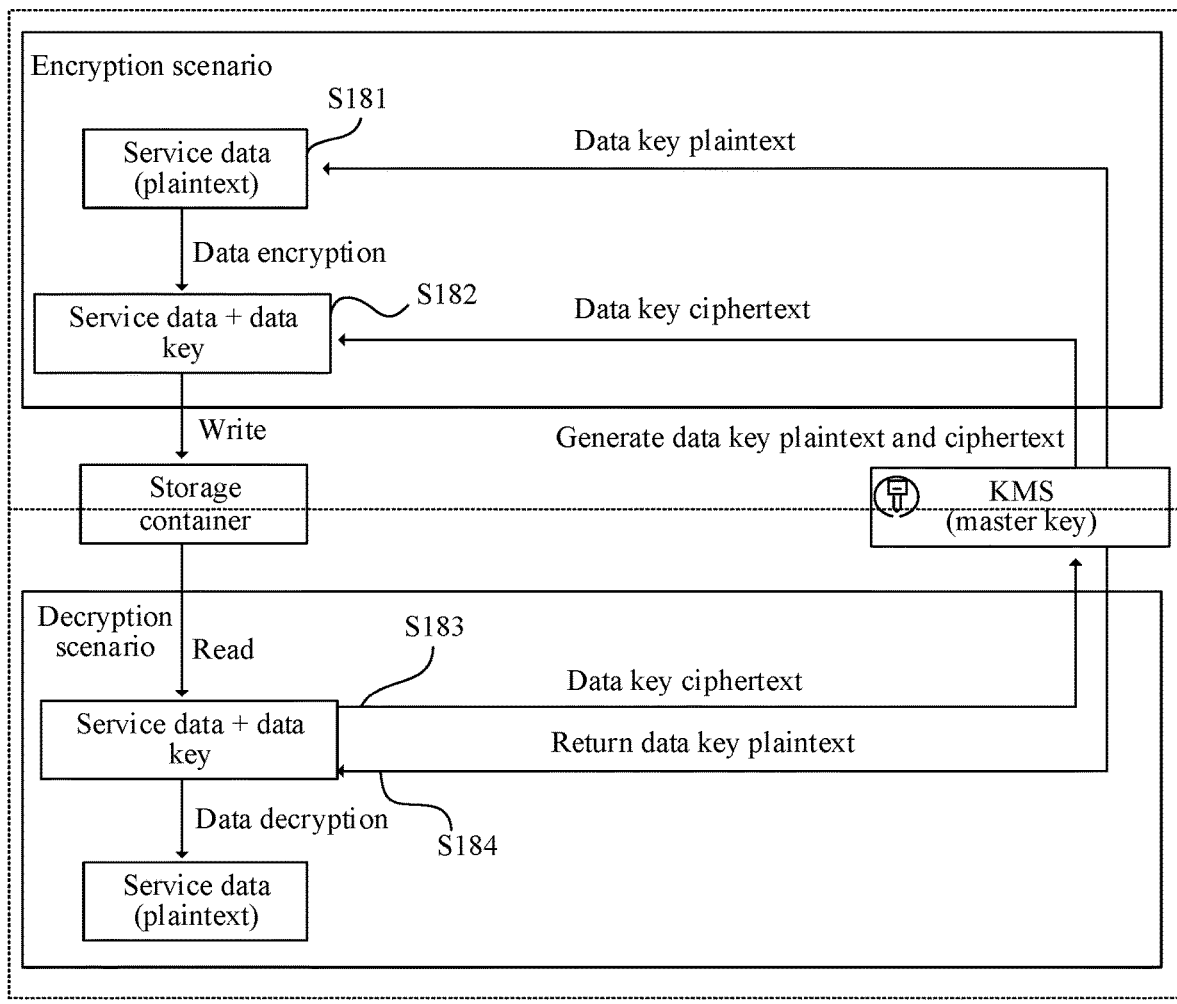
FIG. 18 is a schematic diagram of a data encryption and decryption process in an envelope encryption usage scenario according to an embodiment of this application.

FIG. 18 is a schematic diagram of a data encryption and decryption process in an envelope encryption usage scenario according to an embodiment of this application. As shown in FIG. 18, by using the generated master key as an important resource, the KMS obtains the plaintext and the ciphertext of the data key according to the master key.

According to an actual service scenario, in a service encryption scenario, in step S181, the user encrypts local service data using the plaintext of the data key in the internal memory to obtain encrypted data. Then, in step S182, the ciphertext of the data key and the encrypted service data are written.

In a service decryption scenario, in step S183, the ciphertext of the data key may be decrypted by the KMS. Then, in step S184, the plaintext of the decrypted data key obtained from the decryption is decrypted in the internal memory.

When the user wants to use the plaintext of the data key, the user may request the KMS for the plaintext of the data key, and the encryption and decryption of the service data are implemented locally, thereby reducing the communication costs of the network and improving the efficiency of encryption and decryption.

In some embodiments, compatibility between multiple hardware security module products may further be achieved, to support China's national and international compliance standards. According to compliance requirements, a product in China needs to meet China's national commercial cryptographic algorithm (sm series) for encryption and decryption operations, and international services need to comply with the FIPS standard developed by the NIST, which means that national and international services involve different hardware security module manufacturers. Assuming that manufacturers A and B are hardware security module manufacturers in China, and manufacturers C and D are foreign hardware security module manufacturers, a basic structural diagram is shown in FIG. 19, which is an architectural diagram showing multiple hardware security module manufacturers which are compatible with each other according to an embodiment of this application.

Figure 19:
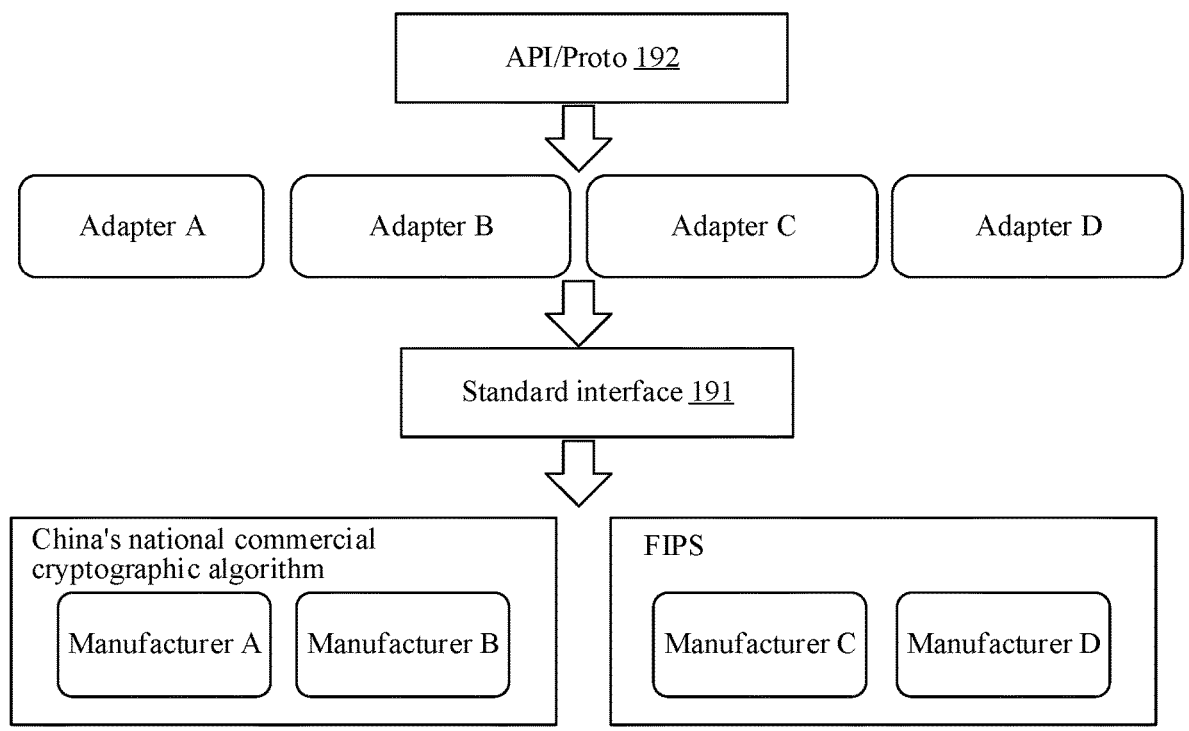
FIG. 19 is an architectural diagram showing multiple hardware security module manufacturers which are compatible with each other according to an embodiment of this application.

Referring to FIG. 19, hardware security modules of the manufacturers are a basic layer. Although the hardware security modules all provide a standard interface 191 to the outside, they are implemented in quite different manners, and therefore vary greatly in the usage process. In order to package these differences and provide consistent functional services to the outside, an adapter mode which is a software design mode is adopted, i.e., different adapters, such as adapter A, adapter B, adapter C, and adapter D in FIG. 19, are created to provide a unified API/Proto 192 to the outside.

Figure 20:
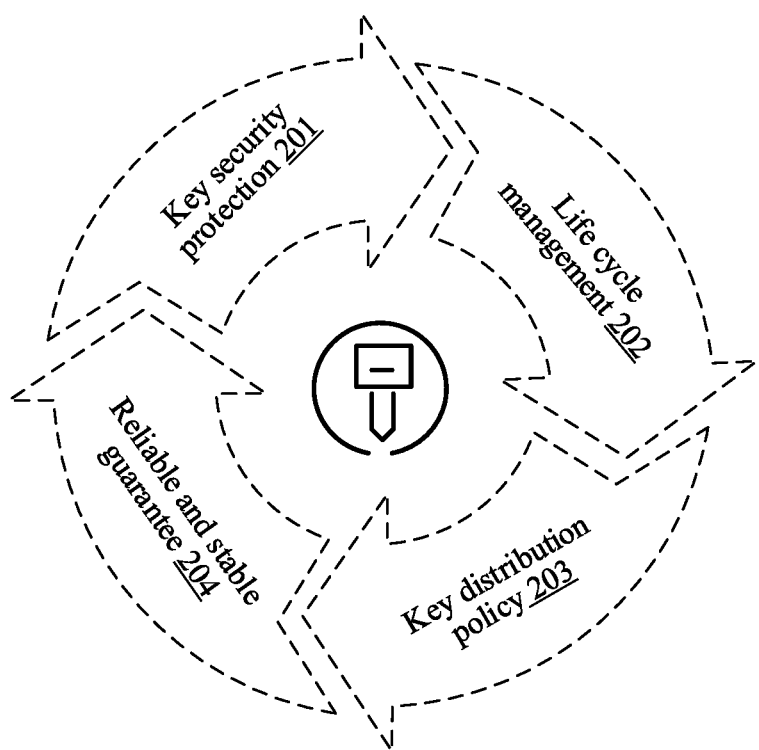
FIG. 20 is a key point diagram of a key management system according to an embodiment of this application.

FIG. 20 is a key point diagram of a key management system according to an embodiment of this application. As shown in FIG. 20, the key points include: key security protection 201, life cycle management 202, key distribution policy 203, and reliable and stable guarantee 204. The key management system has the following characteristics: separation of keys from encrypted data; separation of key management from system operation and maintenance; key generation/storage security and reliability authentication functions, and automatic control of the whole process from key generation to key destruction; automated control of access authorization, access auditing, encryption/decryption, etc.; whether the system is available and whether encrypted data is available depend on the integrity and availability of the key; high availability and reliability guarantee of key storage, service, and access system; a data security management policy formulated regarding key management for the entire system; key management policies for cloud, hybrid-cloud, and multi-cloud environments; a multi-system key access relationship, etc.

Figure 21:
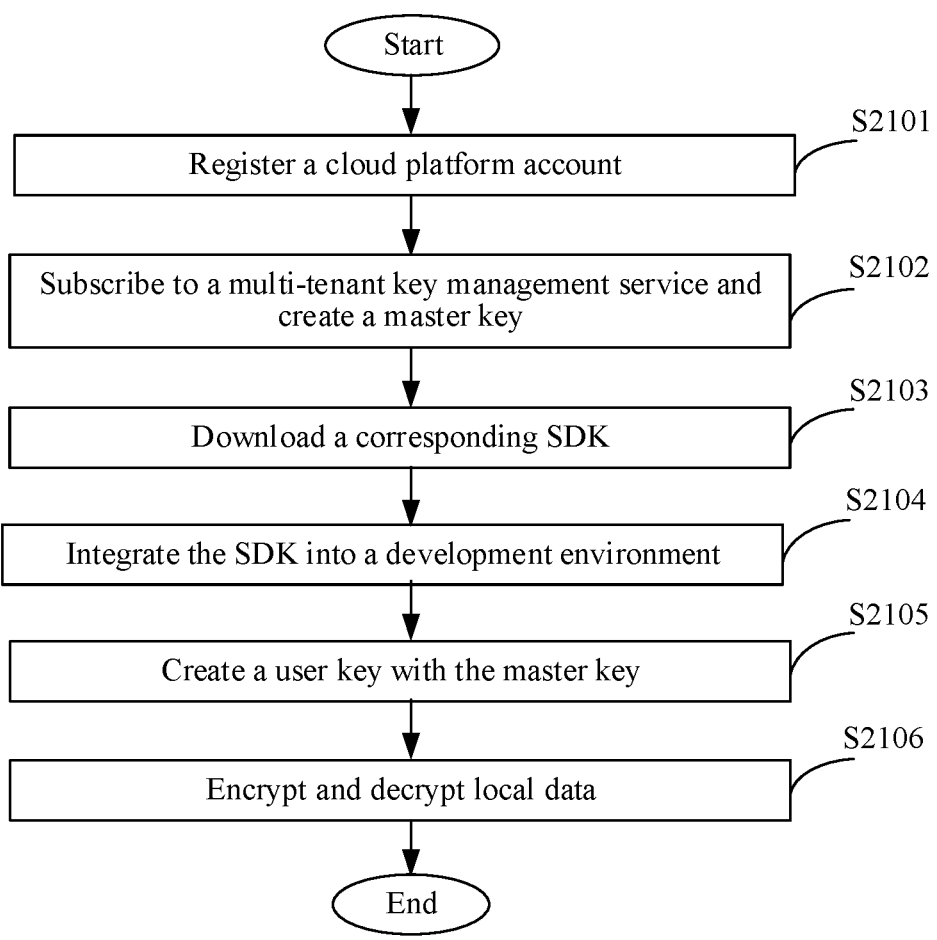
FIG. 21 is a schematic diagram of a usage process of a multi-tenant key management system according to an embodiment of this application.

Because a complete back-end system requires functions such as authentication, logging, auditing, accounting, and monitoring in addition to service functions, a two-location three-center deployment is adopted in the embodiments of this application to achieve load balancing. The multi-tenant key management system based on the cloud platform may be used following usage specifications and steps. FIG. 21 is a schematic diagram of a usage process of a multi-tenant key management system according to an embodiment of this application. As shown in FIG. 21, the process includes the following steps:

Step S2101: Register a cloud platform account.

Step S2102: Subscribe to a multi-tenant key management service and create a master key.

Step S2103: Download an SDK corresponding to the multi-tenant key management service.

Step S2104: Integrate the SDK into a development environment.

Step S2105: Create a user key (corresponding to the above-mentioned data key) with the master key.

Step S2106: Encrypt and decrypt local data (that is, to-be-encrypted data or to-be-decrypted data) with the user key.

In the embodiments of this application, the multi-tenant key management system provides services based on the cloud platform, requiring the user to register a cloud platform account in advance, purchase a KMS service, download an SDK provided by the KMS to the outside, prepare a local development environment based on a development framework of the cloud platform, and create a user key through the key management system to implement encryption and decryption of local data. Crucial interfaces include interfaces corresponding to generation of a data key and decryption of data.

During generation of a data key, the interface name is: GenerateDataKey; the interface request domain name is: kms.tencentcloudapi.com; the default interface request frequency limit is: 100 times/second; note: a master key may be created in the console in advance.

During decryption of data, the interface name is: Decrypt; the interface request domain name is: kms.tencentcloudapi.com; the default interface request frequency limit is: 300 times/second; the output parameter is: plaintext after decryption. In the embodiments of this application, because the field "plaintext after decryption" is encoded by base64 (which is an encoding and decoding tool), the invoker may perform base64 decoding in order to obtain original plaintext.

In the data processing method provided by the embodiments of this application, a cloud platform-based multi-tenant key management system adapted for conventional hardware security modules is realized, which reduces the difficulty in using keys for users, allows users to create different numbers of keys as needed, and reduces the costs of using hardware security modules. Moreover, users do not need to write their own code to interact with hardware security modules of different manufacturers, which reduces the difficulty of use and allows users to focus on service development. The management of keys by the KMS realizes the isolation of multiple tenant users and ensures the security of keys of different users.

In recent years, incidents of sensitive data leakage have occurred from time to time. To prevent data leakage, the protection of the server may be enhanced, and sensitive data may be encrypted. Among others, the safe storage of keys is a desirable function. However, the conventional method of using hardware security modules poses a high barrier for users. To overcome this barrier, the technical solution provided by the embodiments of this application has to be adopted, and the overall process cannot be replaced.

The following continues to describe an example structure of the data processing apparatus 354 implemented as software modules according to the embodiments of this application. In some embodiments, as shown in FIG. 3, the software modules in the data processing apparatus 354 stored in the memory 350 may be the data processing apparatus in the KMS server 300, including:

a first receiving module 3541, configured to receive a data encryption request transmitted by the client, the data encryption request including to-be-encrypted data and a first key identifier; a first transmission module 3542, configured to transmit the first key identifier to a hardware security module server in a data processing system, obtaining a root key corresponding to the first key identifier from a hardware security module in the data processing system through the hardware security module server, and encrypting the root key to generate a master key; a second receiving module 3543, configured to receive the master key transmitted by the hardware security module server; a first key encryption module 3544, configured to encrypt the master key to generate a data key; and a data encryption module 3545, configured to encrypt the to-be-encrypted data by using the data key to obtain encrypted data.

In some embodiments, the data processing system further includes: a plurality of hardware security module server clusters; and the apparatus further includes: a first determining module, configured to determine a current total service demand of each of the hardware security module server clusters; a second determining module, configured to determine the hardware security module server cluster with a minimum total service demand as a target hardware security module server cluster; and a third determining module, configured to determine any hardware security module server in the target hardware security module server cluster as a target hardware security module server, where correspondingly, the first transmission module is configured to transmit the first key identifier to the target hardware security module server.

In some embodiments, the third determining module is configured to: determine a current service demand of each hardware security module server in the target hardware security module server cluster; and determine the hardware security module server with a minimum service demand is the target hardware security module server.

In some embodiments, the third determining module is configured to: determine a current service demand of each encryptor server in the target encryptor server cluster; and determine any hardware security module server of at least two hardware security module servers whose service demands are less than a first threshold is the target hardware security module server.

In some embodiments, the data processing system further includes: a disaster-tolerant hardware security module server cluster, and the apparatus further includes: a fourth determining module, configured to determine the disaster-tolerant hardware security module server cluster is the target hardware security module server cluster when the total service demand of each of the hardware security module server clusters is greater than a second threshold.

In some embodiments, the data processing system further includes: a cold backup hardware security module; and the apparatus further includes: a root key obtaining module, configured to obtain the root key corresponding to the first key identifier from the cold backup hardware security module when data in all hardware security modules corresponding to each hardware security module server in the data processing system is lost.

In some embodiments, the data key includes key plaintext; and the data encryption module is configured to: encrypt the to-be-encrypted data by using the key plaintext to obtain the encrypted data.

In some embodiments, the data key further includes key ciphertext; and the apparatus further includes: a serialization processing module, configured to serialize the key ciphertext according to a first preset format to obtain processed key ciphertext; and a storage module, configured to store the processed key ciphertext and a correspondence between the key ciphertext and the first key identifier in an internal memory.

In some embodiments, the apparatus further includes: a second obtaining module, configured to obtain a data decryption request, the data decryption request including to-be-decrypted data and a second key identifier; a third obtaining module, configured to obtain target key ciphertext corresponding to the second key identifier from the internal memory; a key decryption module, configured to decrypt the target key ciphertext to obtain target key plaintext corresponding to the key identifier; and a data decryption module, configured to decrypt the to-be-decrypted data by using the target key plaintext to obtain decrypted data.

In some embodiments, the first transmission module is configured to: package the first key identifier in a key obtaining request; transmit the key obtaining request to a hardware security module server in the data processing system, so that the hardware security module server parses the key obtaining request to obtain the first key identifier.

In some embodiments, the apparatus further includes a processing module, configured to load the root key into an internal memory; encrypt the root key in the internal memory to obtain encrypted ciphertext; perform text packaging on the encrypted ciphertext to obtain a key character string; and determine the key character string as the master key.

In some embodiments, the apparatus further includes an adaptation module, configured to perform format conversion on the root key transmitted by each hardware security module through an adapter, to obtain a root key in a second preset format, the second preset format being a unified format output by the hardware security module server; and the processing module is configured to encrypt the root key in the second preset format to generate the master key.

In some other embodiments, the apparatus further includes a cloud platform-based data processing apparatus (not shown in the figure) stored in an HSM server, including: a third receiving module, configured to receive a key obtaining request transmitted by a KMS server, the key obtaining request including a first key identifier; an obtaining module, configured to obtain a root key corresponding to the first key identifier from an HSM; a second key encryption module, configured to encrypt the root key to generate a master key; and a second transmission module, configured to transmit the master key to the KMS server, so that the KMS server generates a data key according to the master key, and encrypts to-be-encrypted data by using the data key.

In some embodiments, the second key encryption module is configured to: load the root key into an internal memory; encrypt the root key in the internal memory to obtain encrypted ciphertext; perform text packaging on the encrypted ciphertext to obtain a key character string; and determine the key character string as the master key.

In some embodiments, the apparatus further includes: a format conversion module, configured to perform format conversion on the root key transmitted by each HSM, to obtain a root key in a second preset format, the second preset format being a unified format output by the HSM; and correspondingly, the second key encryption module is configured to: encrypt the root key in the second preset format to generate the master key.

The descriptions of the apparatus embodiments of this application are similar to the descriptions of the method embodiments, and have beneficial effects similar to those of the method embodiments, so the details will not be repeated herein. For technical details that are not disclosed in the apparatus embodiments, reference may be made to the descriptions of the method embodiments of this application.

The embodiments of this application provide a computer program product or a computer program. The computer program product or the computer program includes computer instructions, the computer instructions being stored in a non-transitory computer-readable storage medium. A processor of a computer device reads the computer instructions from the non-transitory computer-readable storage medium, and executes the computer instructions, to cause the computer device to perform the data processing method according to the embodiments of this application.

The embodiments of this application provide a storage medium storing executable instructions, the executable instructions, when executed by a processor, causing the processor to execute the method provided in the embodiments of this application, for example, the method shown in FIG. 4.

In some embodiments, the storage medium may be non-transitory computer-readable storage medium, e.g., a ferromagnetic random access memory (FRAM), a read only memory (ROM), a programmable read-only memory (PROM), an erasable programmable read-only memory (EPROM), an electrically erasable programmable read-only memory (EEPROM), a flash memory, a magnetic disk, an optic disc, a compact disc read-only memory (CD-ROM), or other memories; or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts). In an example, the executable instructions may be deployed to be executed on a computing device, or deployed to be executed on a plurality of computing devices at the same location, or deployed to be executed on a plurality of computing devices that are distributed in a plurality of locations and interconnected through a communication network.

The foregoing descriptions are merely embodiments of this application and are not intended to limit the protection scope of this application. Any modification, equivalent replacement, or improvement made without departing from the spirit and range of this application shall fall within the protection scope of this application.

INDUSTRIAL APPLICABILITY

In the embodiments of this application, the processing server receives a data encryption request transmitted by the client, and transmits the first key identifier in the data encryption request to the hardware security module server in the data processing system, so that the hardware security module server obtains a root key corresponding to the first key identifier from the hardware security module, and encrypts the root key to generate a master key; then, receives the master key transmitted by the hardware security module server; encrypt the master key to generate a data key; and encrypts to-be-encrypted data by using the data key to obtain encrypted data. Through the embodiments of this application, data to be encrypted can be accurately and effectively encrypted by using the generated data key, thereby improving the accuracy of data encryption and the security of the data processing process. Therefore, this application has great industrial practicability.

What is claimed is:

1. A data processing method comprising:
receiving a data encryption request transmitted by a client comprising to-be-encrypted data and a first key identifier;
determining a current total service demand of a first hardware security module server cluster and a current total service demand of a second hardware security module server cluster, wherein the current total service demand is a sum of service demands of all servers in each of the respective first and second hardware security module server clusters, and wherein the service demand is a quantity of a key requesting service or a data encryption service;
determining a target hardware security module server cluster based on the hardware security module server cluster with a minimum total service demand;
determining a target hardware security module server of the target hardware security module server cluster;
transmitting the first key identifier to the target hardware security module server such that the target hardware security module server obtains a root key corresponding to the first key identifier and encrypts the root key to generate a master key;
receiving the master key transmitted by the target hardware security module server;
encrypting the master key to generate a data key; and,
encrypting the to-be-encrypted data using the data key to generate encrypted data.

2. The method according to claim 1, wherein the determining the target hardware security module server further comprises:
determining a current service demand of each hardware security module server in the target hardware security module server cluster; and,
determining the target hardware security module server based on the hardware security module server with a minimum service demand.

3. The method according to claim 1, wherein the determining the target hardware security module server further comprises:
determining a current service demand of each hardware security module server in the target hardware security module server cluster; and,
determining the target hardware security module server based on at least two hardware security module servers whose service demands are less than a threshold.

4. The method according to claim 1 further comprising:
determining the target hardware security module server cluster is a disaster-tolerant hardware security module server cluster when the current total service demand of each of the first and the second hardware security module server clusters is greater than a threshold.

5. The method according to claim 1 further comprising:
obtaining the root key from a cold backup hardware security module when data in all the hardware security modules corresponding to each hardware security module server is lost.

6. The method according to claim 1, wherein the data key comprises key plaintext, and the encrypting the to-be-encrypted data further comprises:
encrypting the to-be-encrypted data by using the key plaintext to generate the encrypted data.

7. The method according to claim 6, wherein the data key further comprises key ciphertext, the method further comprising:
serializing the key ciphertext according to a preset format to generate processed key ciphertext; and,
storing the processed key ciphertext and a correspondence between the key ciphertext and the first key identifier in an internal memory.

8. The method according to claim 7, the method further comprising:
obtaining a data decryption request comprising to-be-decrypted data and a second key identifier;
obtaining target key ciphertext corresponding to the second key identifier from the internal memory;
decrypting the target key ciphertext to generate target key plaintext corresponding to the second key identifier; and,
decrypting the to-be-decrypted data by using the target key plaintext to generate decrypted data.

9. The method according to claim 1, wherein the transmitting the first key identifier further comprises:
packaging, by a processing server, the first key identifier in a key obtaining request; and,
transmitting the key obtaining request to the target hardware security module server such that the target hardware security module server parses the key obtaining request to obtain the first key identifier.

10. The method according to claim 1, wherein the encrypting, by the target hardware security module server, the root key further comprises:
loading, by the target hardware security module server, the root key into an internal memory;
encrypting the root key in the internal memory to generate encrypted ciphertext;
performing text packaging on the encrypted ciphertext to generate a key character string; and,
defining the master key as the key character string.

11. The method according to claim 1, the method further comprising:

performing format conversion of the root key transmitted by the target hardware security module through an adapter to obtain a root key in a preset format, the preset format being a unified format output by the target hardware security module server; and wherein the encrypting the root key further comprises:

encrypting, by the target hardware security module server, the root key in the preset format to generate the master key.

12. A computer device, comprising a processor and a memory, the memory storing at least one instruction, at least one program, a code set, or an instruction set, and the at least one instruction, the at least one program, the code set, or the instruction set being loaded and executed by the processor to implement the data processing method according to claim 1.

13. An apparatus, comprising:
a memory, the memory storing computer-readable instructions for data processing; and
a processor in communication with the memory, the processor configured by the computer-readable instruction to:
receive a data encryption request transmitted by a client, the data encryption request comprising to-be-encrypted data and a first key identifier;
determine a current total service demand of a first hardware security module server cluster and a current total service demand of a second hardware security module server cluster, wherein the current total service demand is a sum of service demands of all servers in each of the respective first and second hardware security module server clusters, and wherein the service demand is a quantity of a key requesting service or a data encryption service;
determine a target hardware security module server cluster based on the hardware security module server cluster with a minimum total service demand;
determine a target hardware security module server of the target hardware security module server cluster
transmit the first key identifier to the target hardware security module server in a data processing system, the target hardware security module server configured to obtain a root key corresponding to the first key identifier from a hardware security module in the data processing system through the target hardware security module server and encrypt the root key to generate a master key;
receive the master key transmitted by the target hardware security module server;
encrypt the master key to generate a data key; and,
encrypt the to-be-encrypted data by using the data key to generate encrypted data.

14. A non-transitory computer-readable storage medium, storing at least one instruction, at least one program, a code set, or an instruction set, the at least one instruction, the at least one program, the code set, or the instruction set being loaded and executed by a processor to implement a data processing method comprising:
receiving a data encryption request transmitted by a client comprising to-be-encrypted data and a first key identifier;
determining a current total service demand of a first hardware security module server cluster and a current total service demand of a second hardware security module server cluster, wherein the current total service demand is a sum of service demands of all servers in each of the respective first and second hardware security module server clusters, and wherein the service demand is a quantity of a key requesting service or a data encryption service;
determining a target hardware security module server cluster based on the hardware security module server cluster with a minimum total service demand;
determining a target hardware security module server of the target hardware security module server cluster;
transmitting the first key identifier to the target hardware security module server such that the target hardware security module server obtains a root key corresponding to the first key identifier and encrypts the root key to generate a master key;
receiving the master key transmitted by the target hardware security module server;
encrypting the master key to generate a data key; and,
encrypting the to-be-encrypted data using the data key to generate encrypted data.

15. The non-transitory computer-readable storage medium according to claim 14, wherein the determining the target hardware security module server further comprises:
determining a current service demand of each hardware security module server in the target hardware security module server cluster; and,
determining the target hardware security module server based on the hardware security module server with a minimum service demand.

16. The non-transitory computer-readable storage medium according to claim 14, wherein the data key comprises key plaintext, and the encrypting the to-be-encrypted data further comprises:
encrypting the to-be-encrypted data by using the key plaintext to generate the encrypted data.

17. The non-transitory computer-readable storage medium according to claim 14, wherein the encrypting, by the target hardware security module server, the root key further comprises:
loading, by the target hardware security module server, the root key into an internal memory;
encrypting the root key in the internal memory to generate encrypted ciphertext;
performing text packaging on the encrypted ciphertext to generate a key character string; and,
defining the master key as the key character string.

18. The non-transitory computer-readable storage medium according to claim 14, further comprising:
performing format conversion of the root key transmitted by the hardware security module through an adapter to obtain a root key in a preset format, the preset format being a unified format output by the target hardware security module server; and
wherein the encrypting the root key further comprises:
encrypting, by the target hardware security module server, the root key in the preset format to generate the master key.

19. The non-transitory computer-readable storage medium according to claim 14, wherein the determining the target hardware security module server further comprises:
determining a current service demand of each hardware security module server in the target hardware security module server cluster; and,
determining the target hardware security module server based on at least two hardware security module servers whose service demands are less than a threshold.

20. The non-transitory computer-readable storage medium according to claim 14, wherein the transmitting the first key identifier further comprises:

packaging, by a processing server, the first key identifier in a key obtaining request; and, transmitting the key obtaining request to the target hardware security module server such that the target hardware security module server parses the key obtaining request to obtain the first key identifier.

* * * * *